(12) United States Patent
Campbell

(10) Patent No.: US 11,092,409 B1
(45) Date of Patent: Aug. 17, 2021

(54) SIGHTING SYSTEM FOR A FIREARM

(71) Applicant: Robert Marshall Campbell, Miami, FL (US)

(72) Inventor: Robert Marshall Campbell, Miami, FL (US)

(*) Notice: Subject to any disclaimer, the term of this patent is extended or adjusted under 35 U.S.C. 154(b) by 14 days.

(21) Appl. No.: 16/519,919

(22) Filed: Jul. 23, 2019

Related U.S. Application Data

(63) Continuation of application No. 15/884,067, filed on Jan. 30, 2018, now Pat. No. 10,359,256.

(Continued)

(51) Int. Cl.

| | |
|---|---|
| *F41G 3/16* | (2006.01) |
| *F41G 1/473* | (2006.01) |
| *F41J 5/10* | (2006.01) |
| *H04M 1/04* | (2006.01) |
| *H04N 5/225* | (2006.01) |
| *H04M 1/02* | (2006.01) |
| *F41G 11/00* | (2006.01) |
| *H04M 1/72412* | (2021.01) |

(52) U.S. Cl.
CPC ............ *F41G 1/473* (2013.01); *F41G 11/005* (2013.01); *F41J 5/10* (2013.01); *H04M 1/026* (2013.01); *H04M 1/04* (2013.01); *H04N 5/2252* (2013.01); *H04N 5/2253* (2013.01); *H04N 5/2257* (2013.01); *F41G 11/003* (2013.01); *H04M 1/72412* (2021.01); *H04M 2250/52* (2013.01)

(58) Field of Classification Search
CPC ... F41G 3/16; F41G 3/165; F41G 1/00; F41G 11/00; F41G 11/003; F41G 11/005
See application file for complete search history.

(56) References Cited

U.S. PATENT DOCUMENTS

| | | | |
|---|---|---|---|
| 8,297,173 B1* | 10/2012 | Teetzel | F41G 3/165 |
| | | | 89/41.17 |
| 9,291,424 B2* | 3/2016 | Tagarro | H04N 5/2253 |

(Continued)

*Primary Examiner* — J. Woodrow Eldred
(74) *Attorney, Agent, or Firm* — The Brickell IP Group, PLLC; Javier Sobrado; Arthur Robert Weaver

(57) ABSTRACT

A sighting system for a firearm, configured for securing about a firearm, the sighting system housed in a housing, with a smart phone or smart device mounting platform rotatably coupled thereon, with an additional rear viewing camera, integral or attachable to an armature. This said armature, additionally passes through an open portion of a clamping device, that is attachable to a threaded base portion, of the back side of said smart device mounting platform, and is both height and angularly adjustable. This said sighting device, provides the target image that is either received from other target viewing devices mounted on the firearm, or provides its own target image, to the smart device, where this said target image is viewable by the user, from any position that the user could position himself in relation to the firearm, by means of the said rotatable smartphone or smart device mounting platform. The image of the area behind the user would also be provided at the same time, by means of the said height and angularly adjustable rear viewing camera, that would either display its image simultaneously in a window of, or on, a split screen on the smart device's viewing screen, or would provide the image behind the user simultaneously, in its own viewing screen.

21 Claims, 22 Drawing Sheets

Related U.S. Application Data

(60) Provisional application No. 62/452,986, filed on Jan. 31, 2017, provisional application No. 62/467,197, filed on Mar. 5, 2017.

(56) References Cited

U.S. PATENT DOCUMENTS

2013/0288743 A1* 10/2013 Hunt .................. F16M 11/2014
 455/556.1
2016/0245621 A1* 8/2016 Kintzing ............... F41G 11/003

* cited by examiner

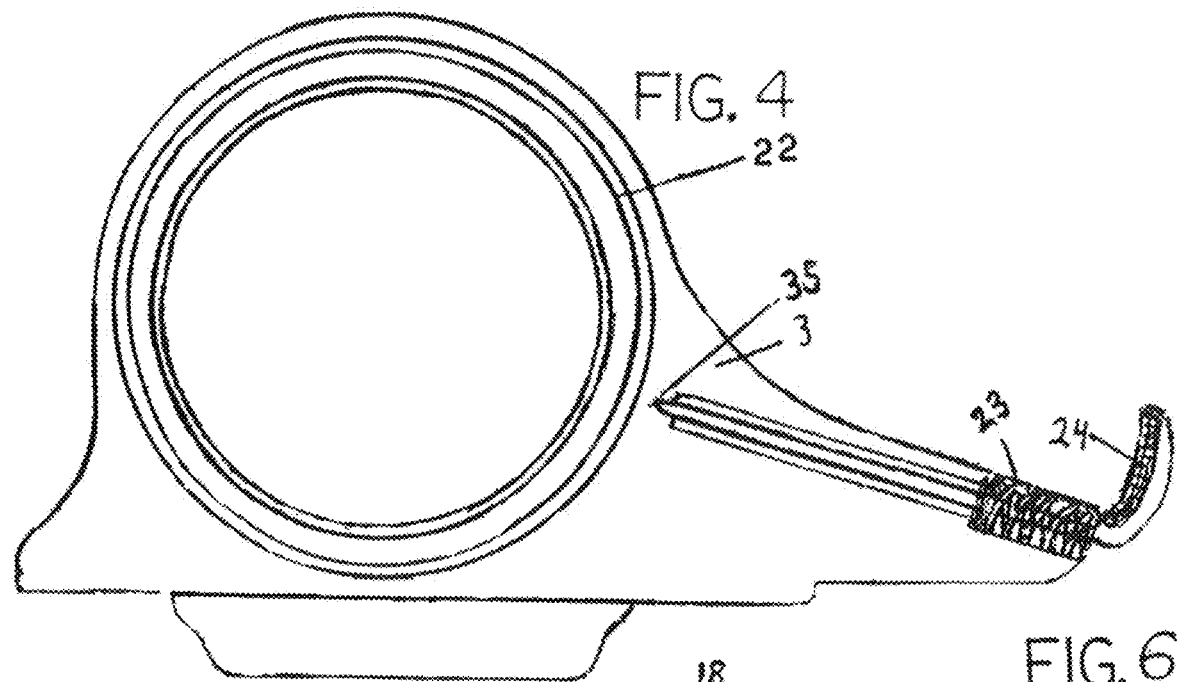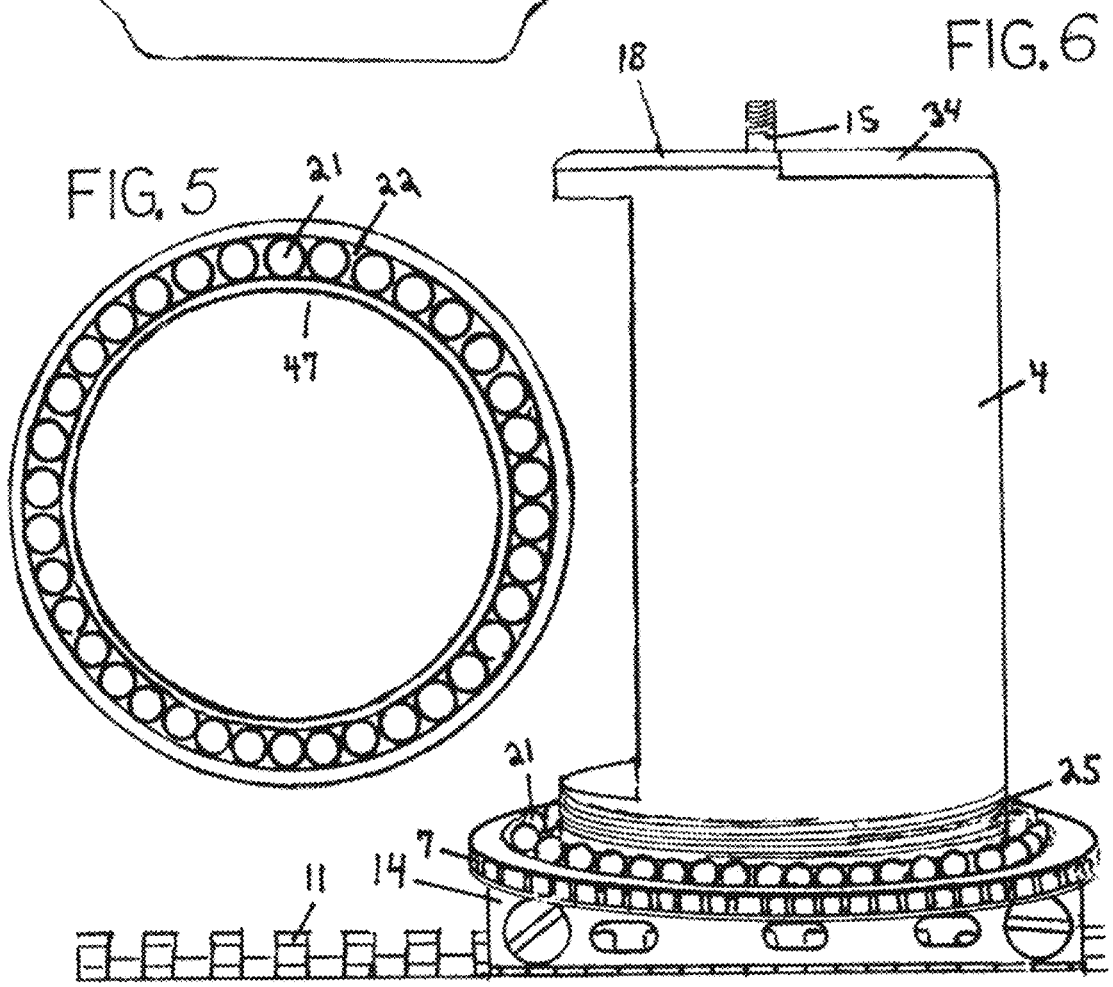

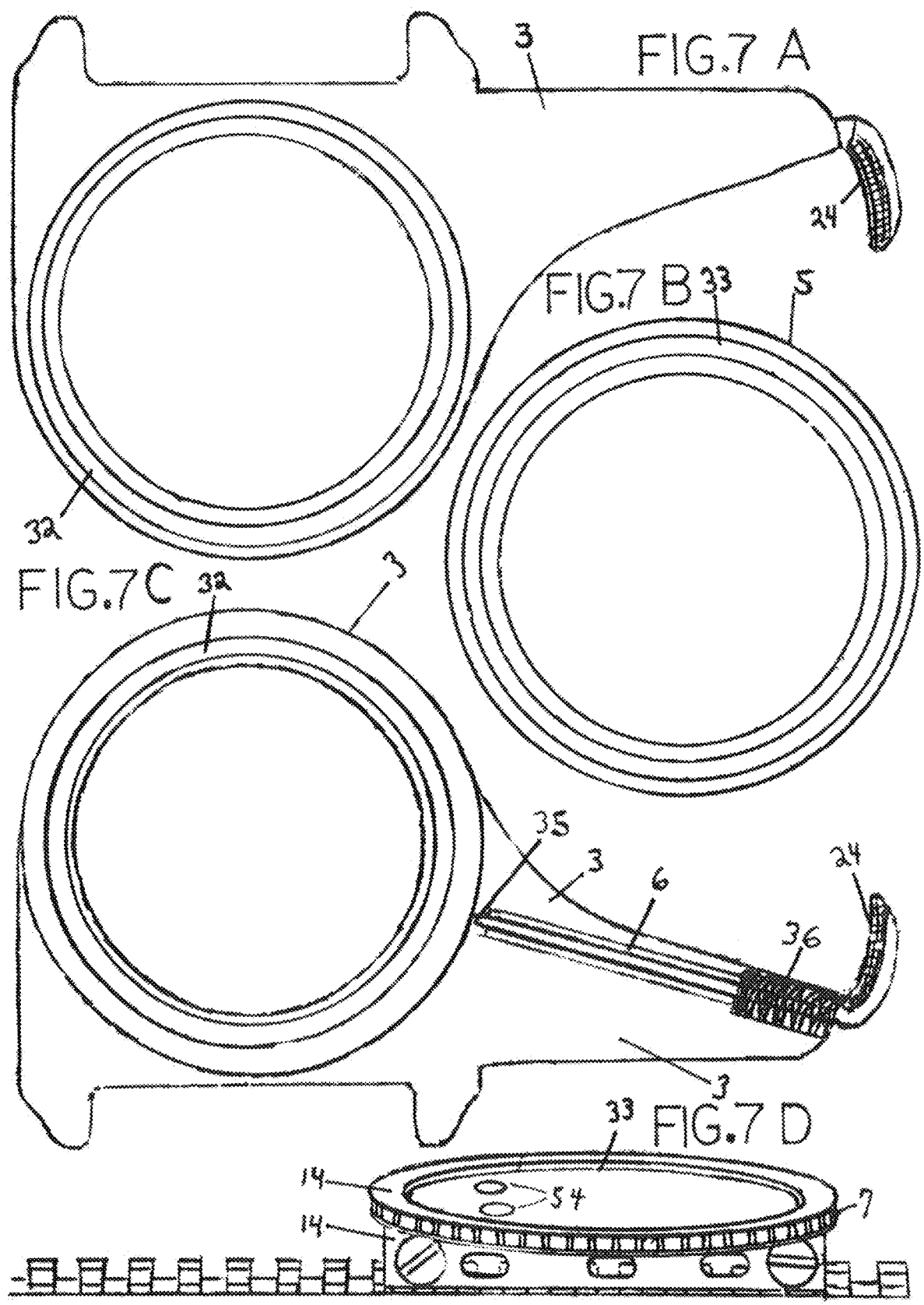

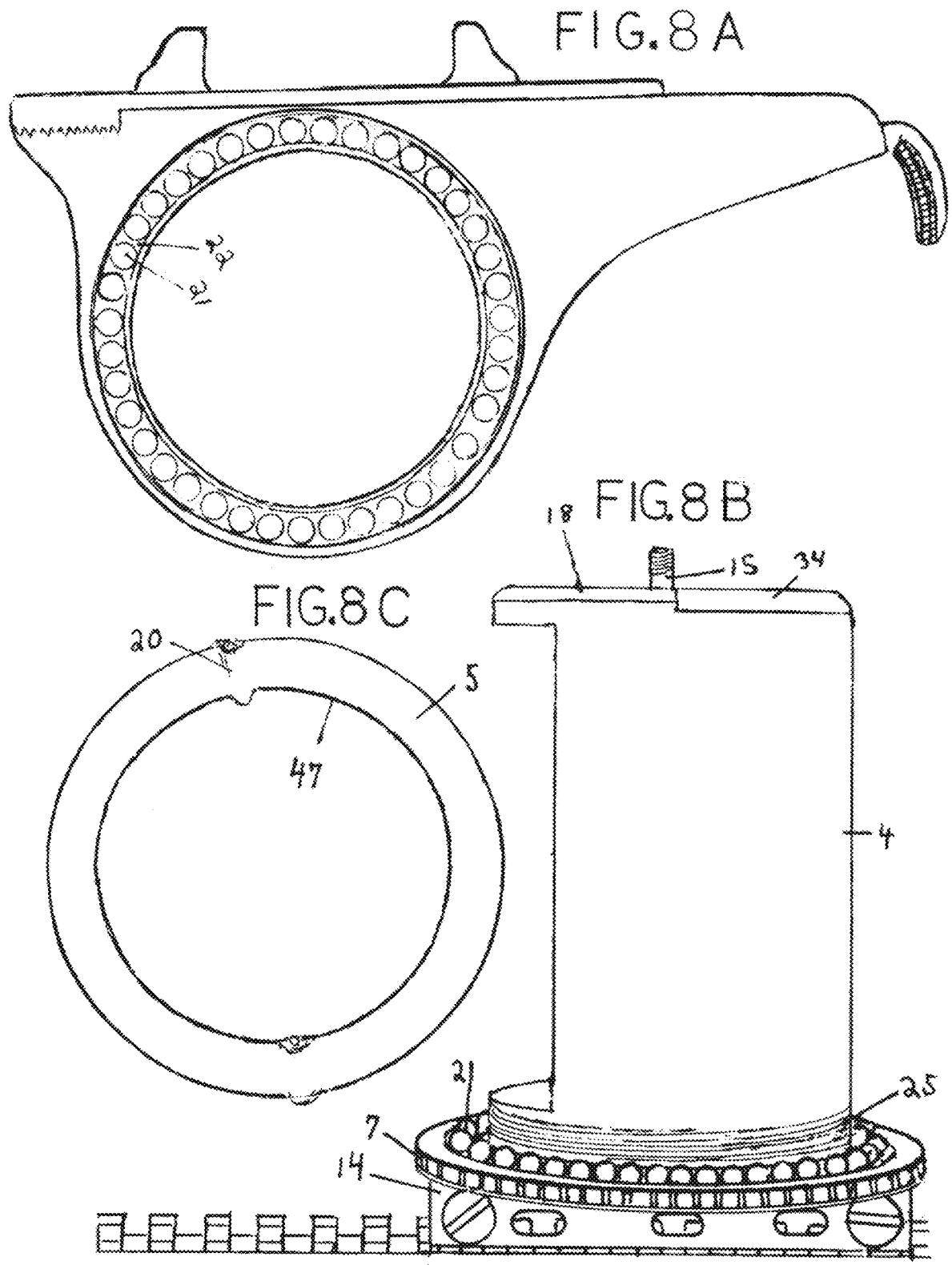

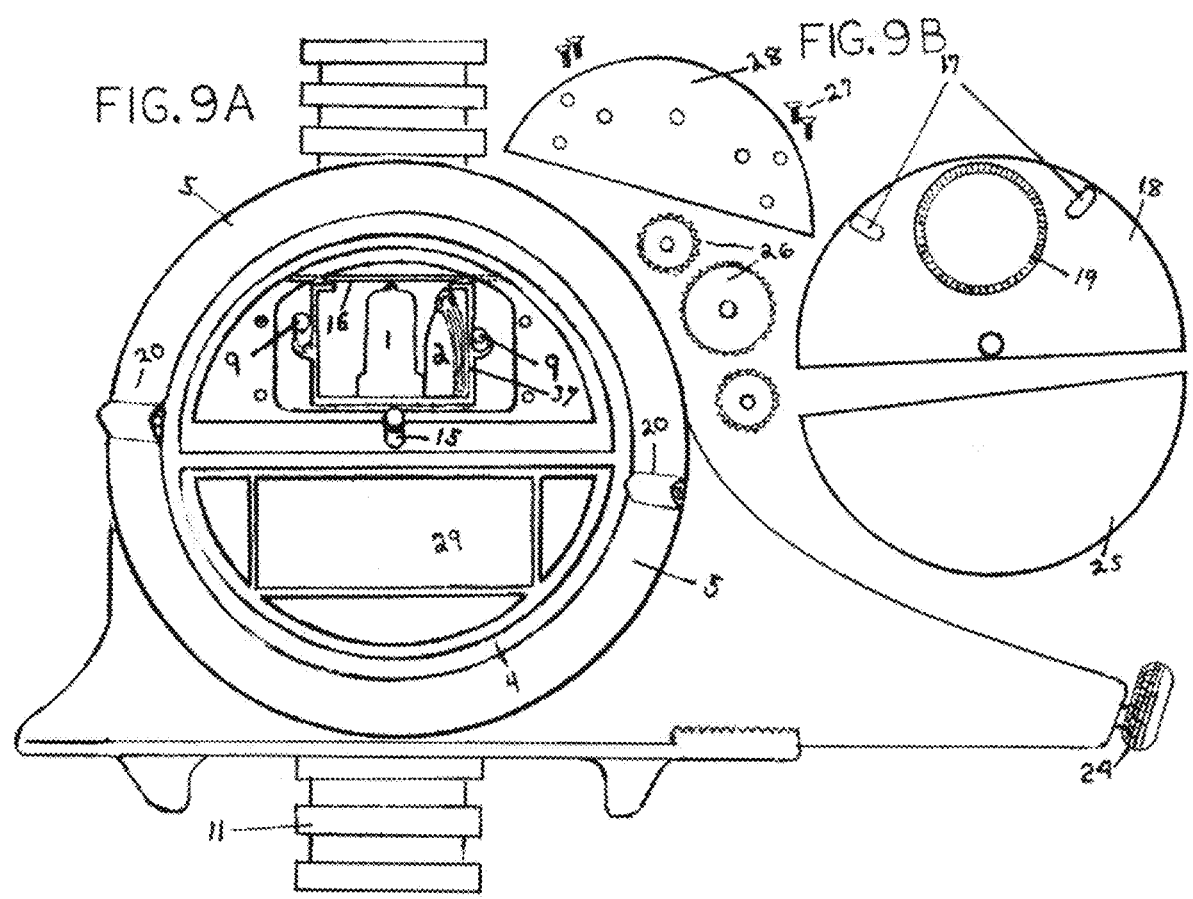

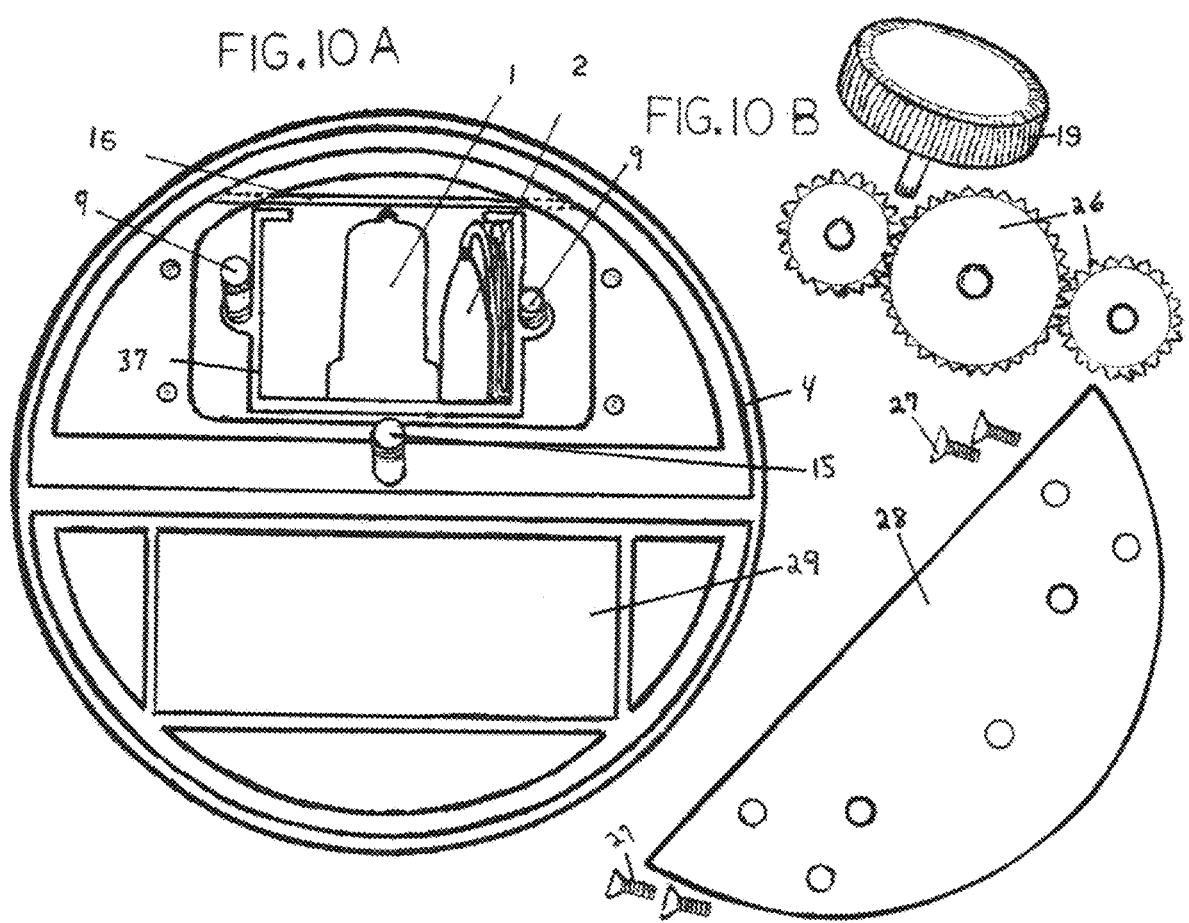

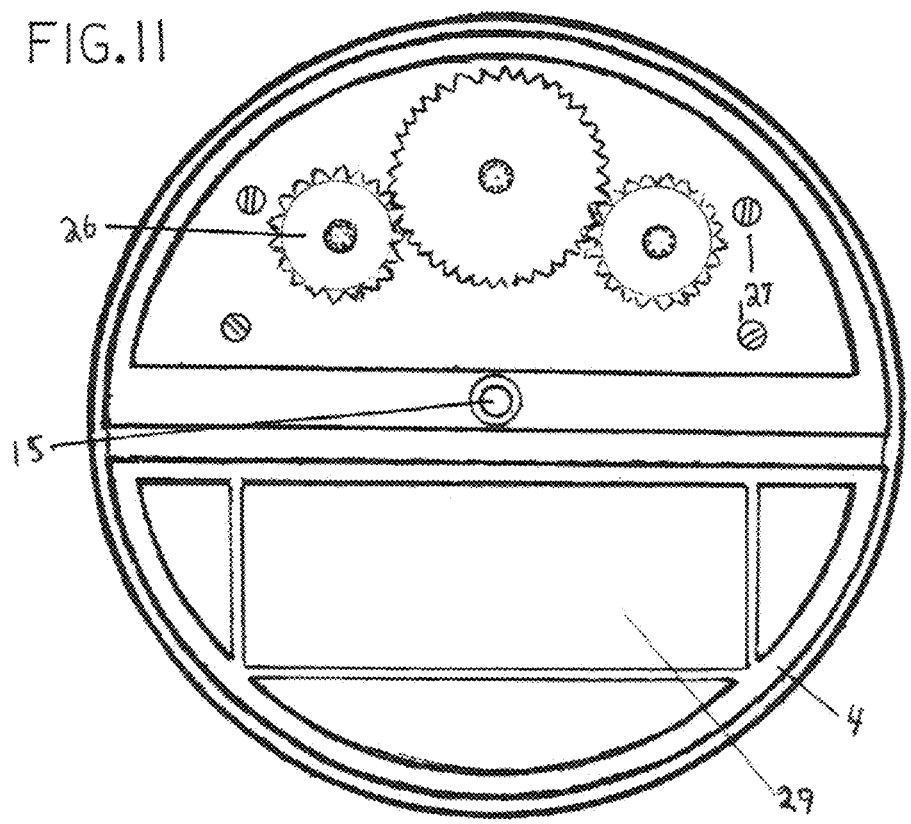

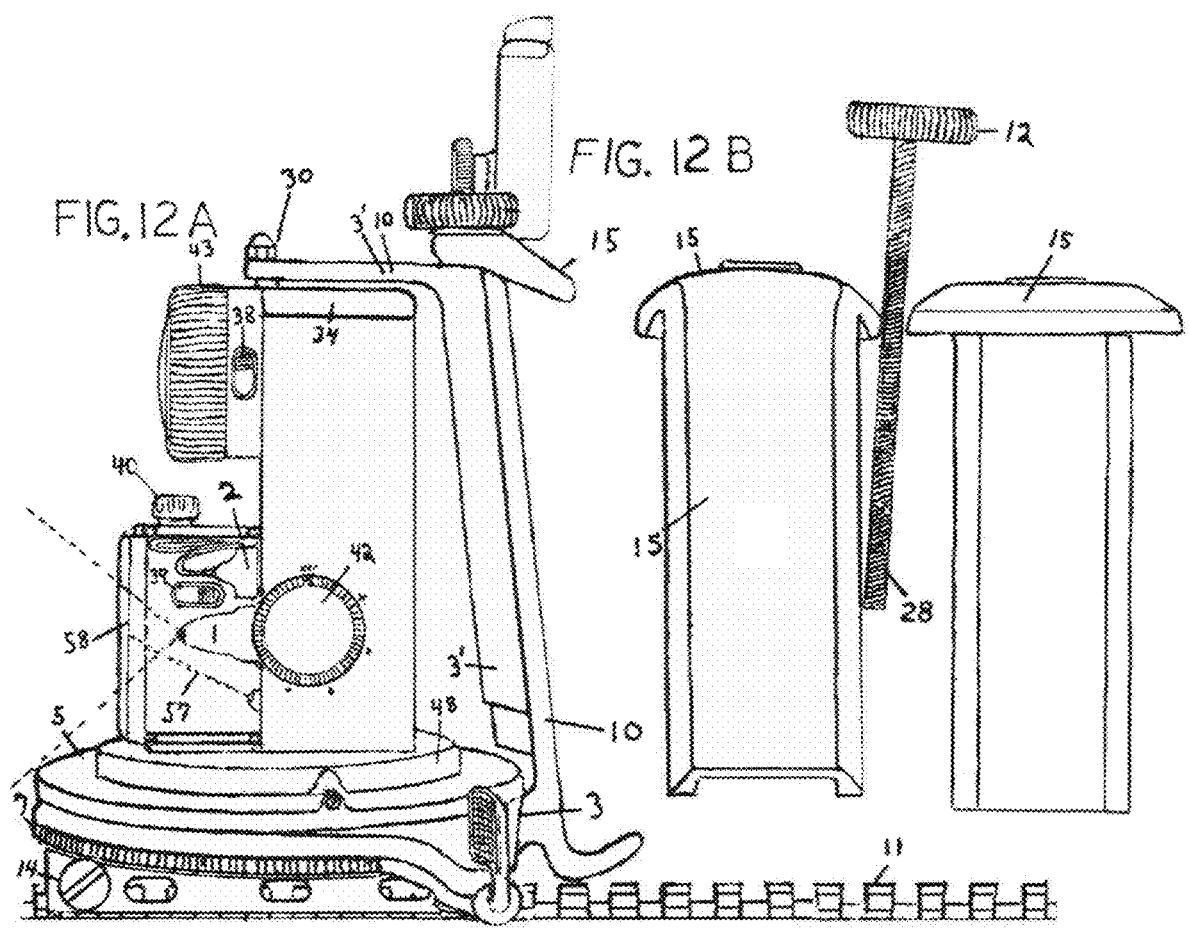

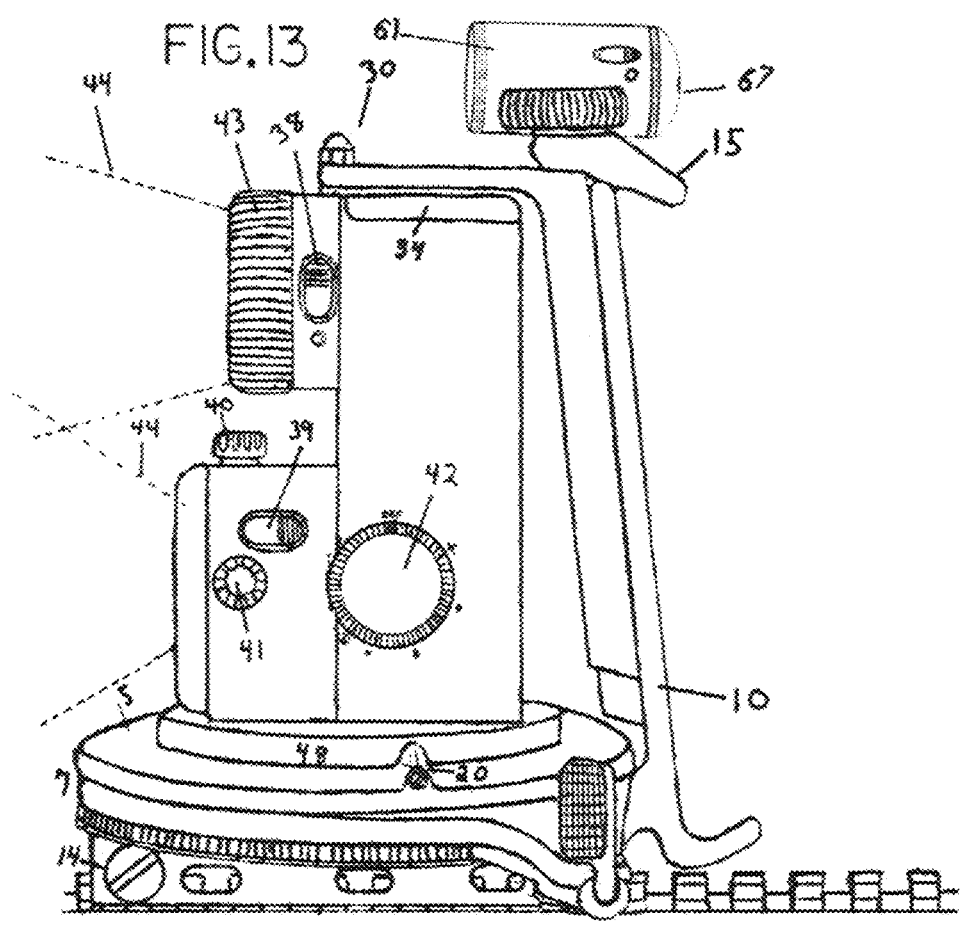

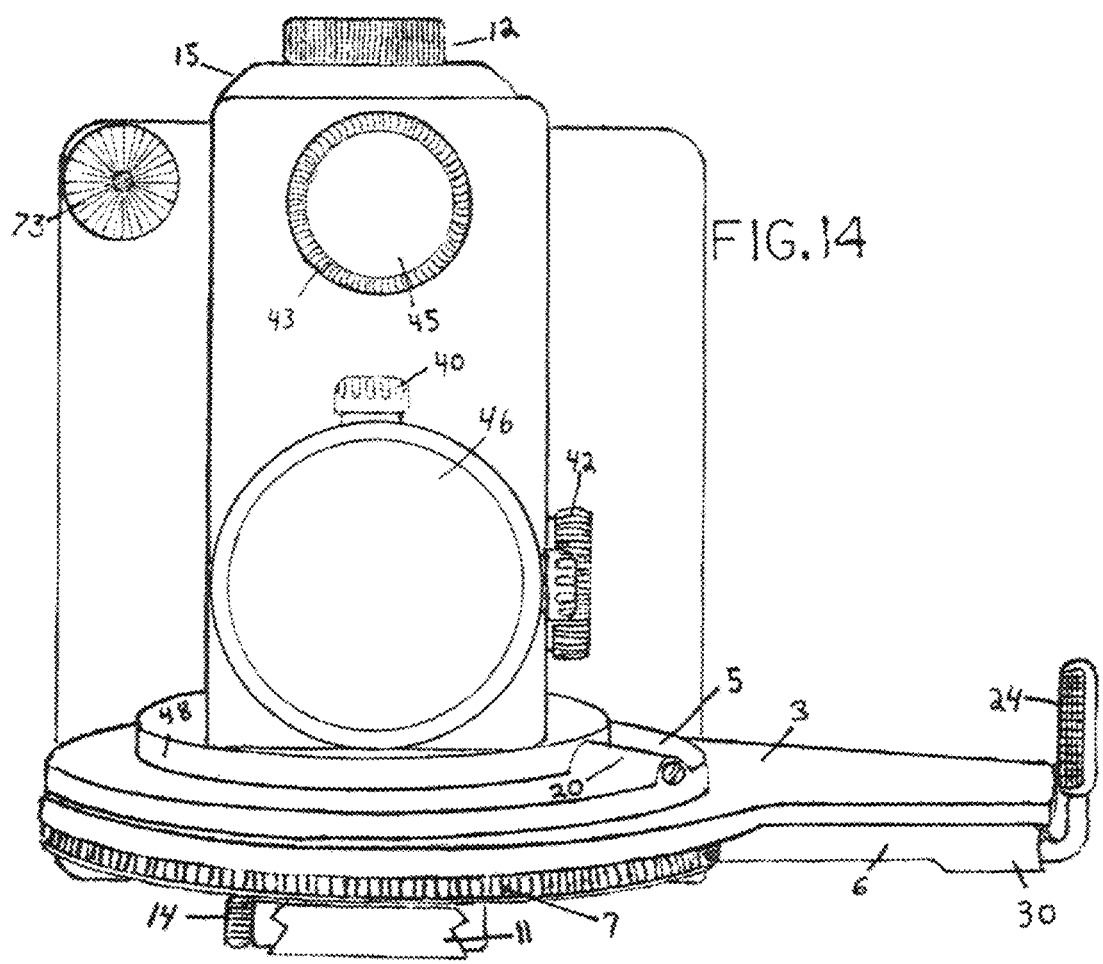

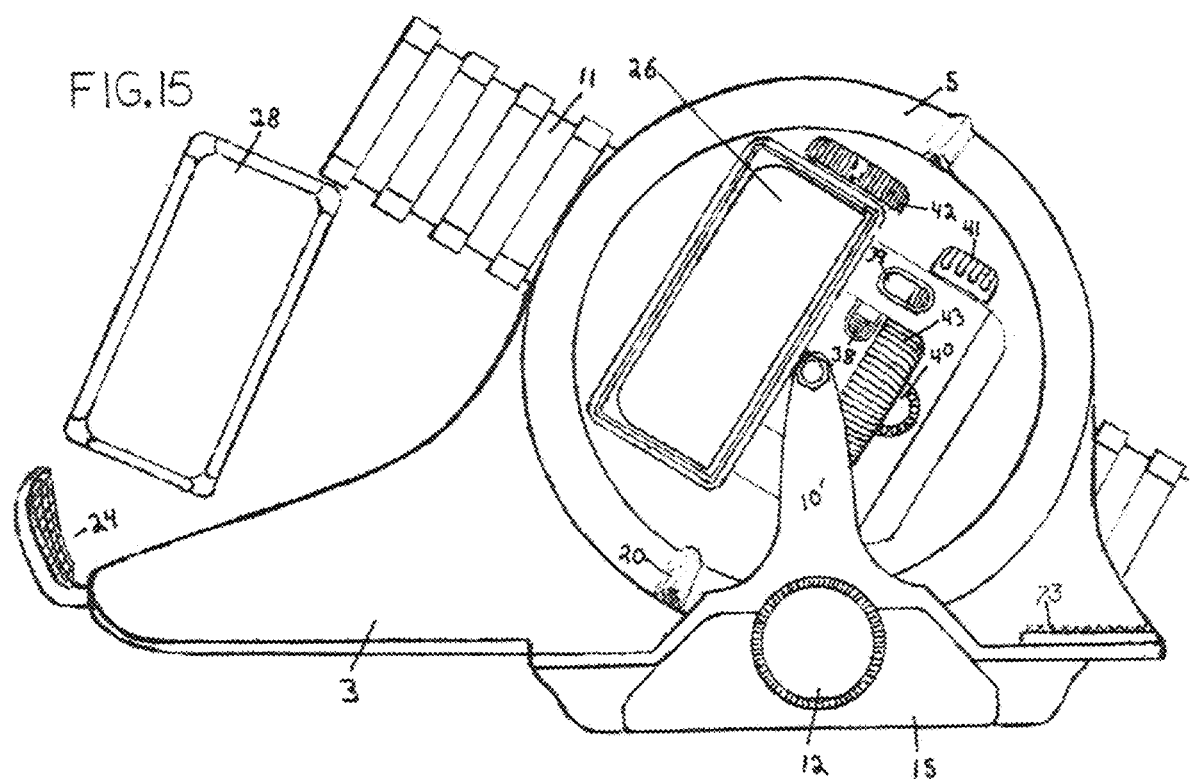

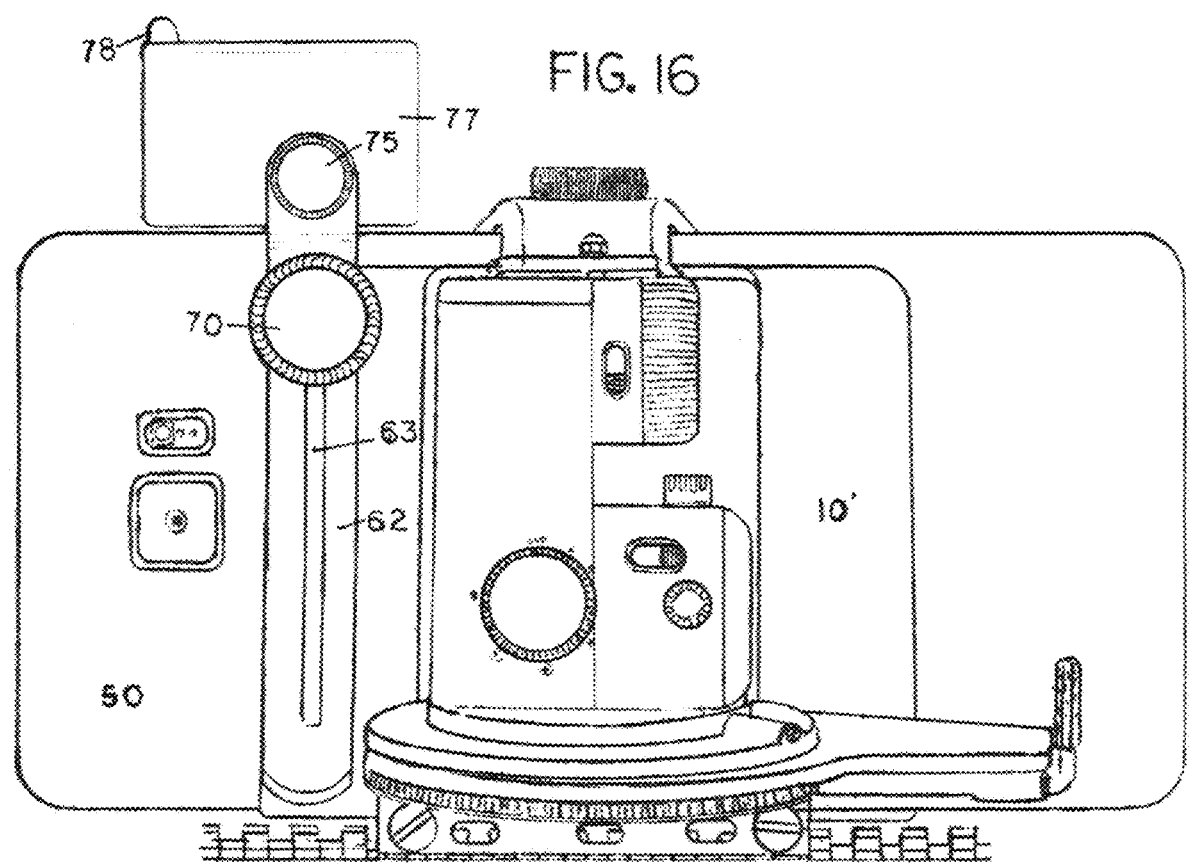

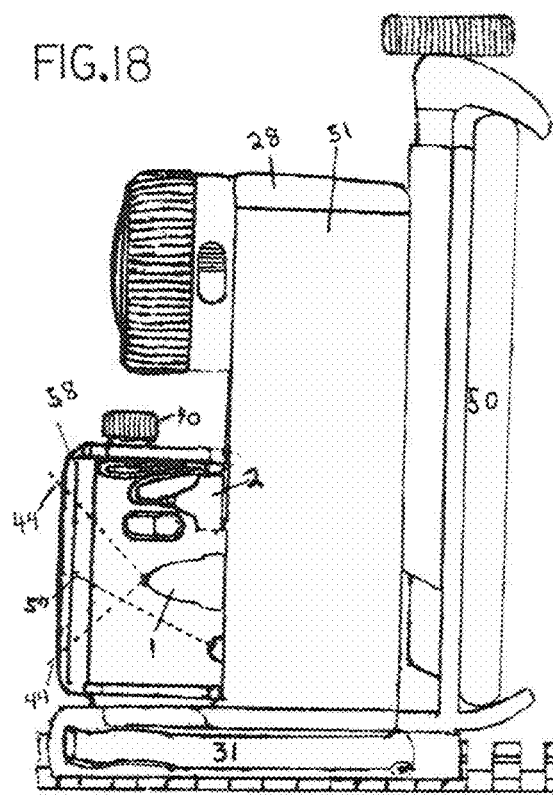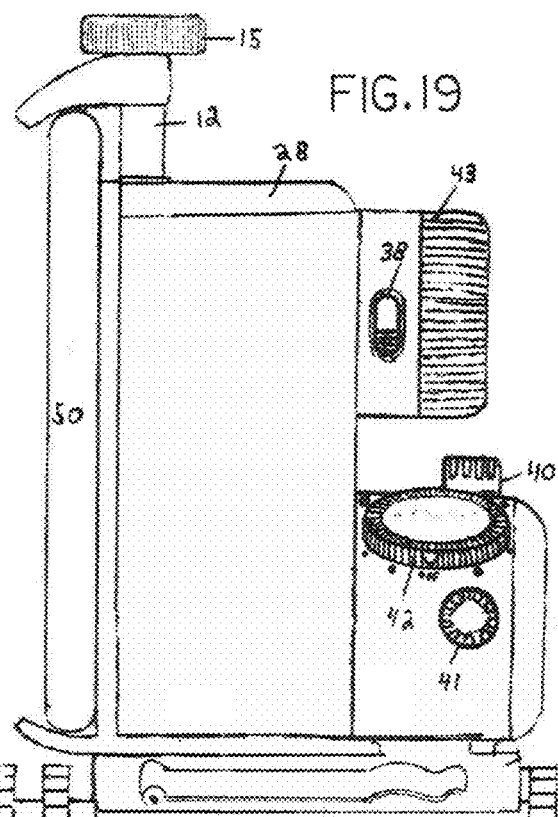

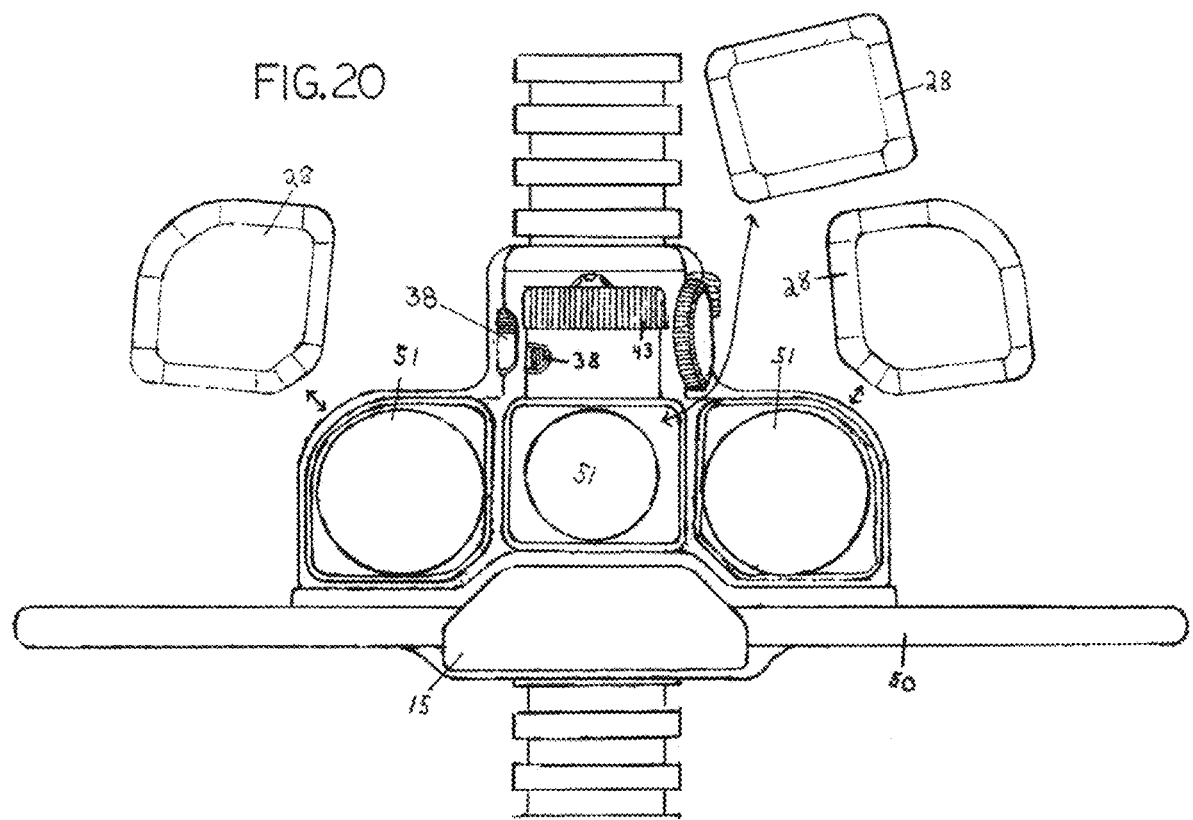

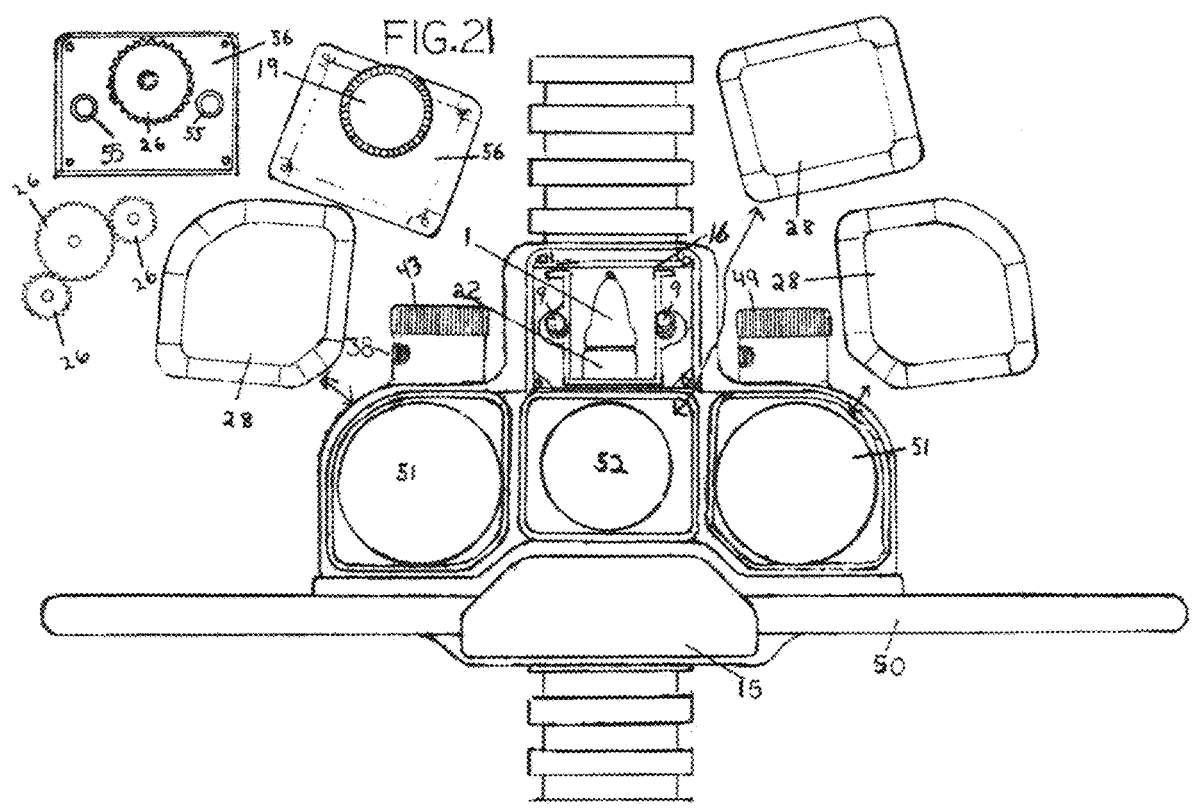

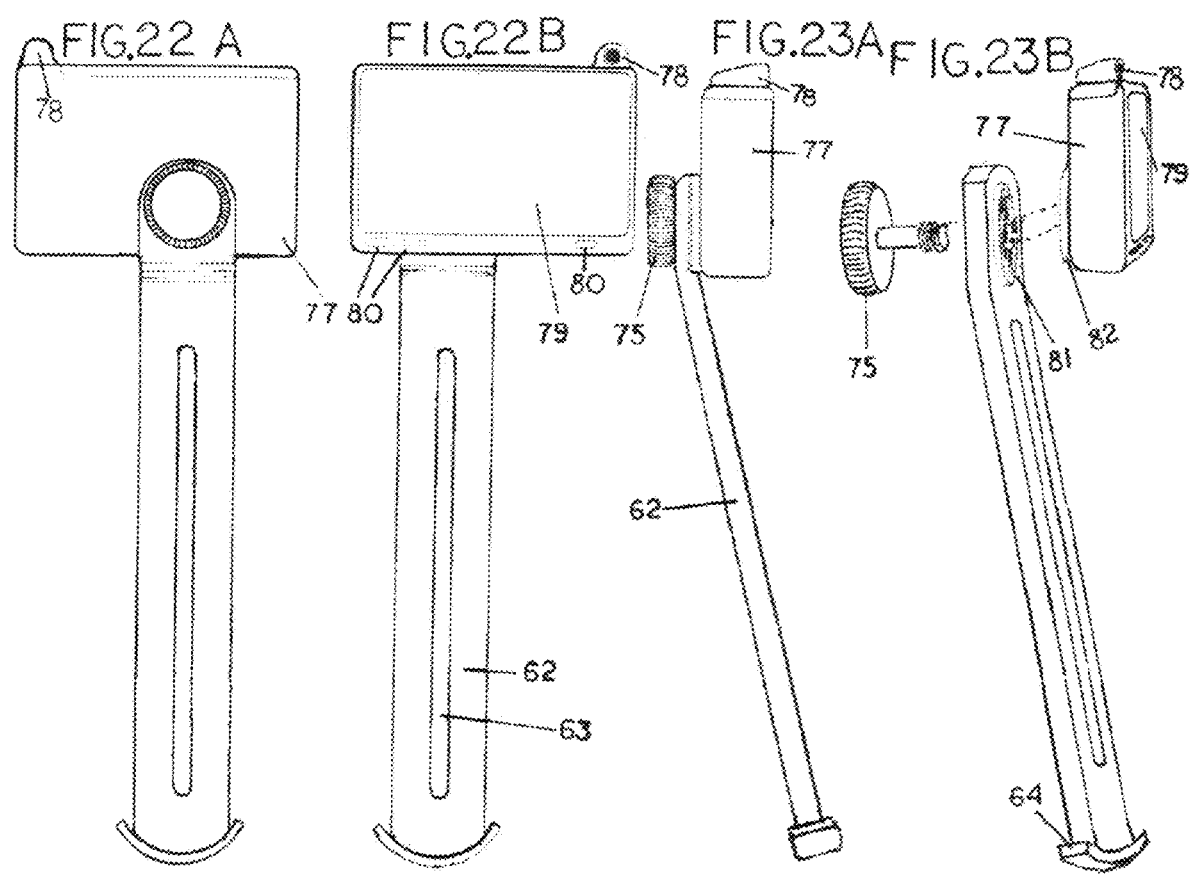

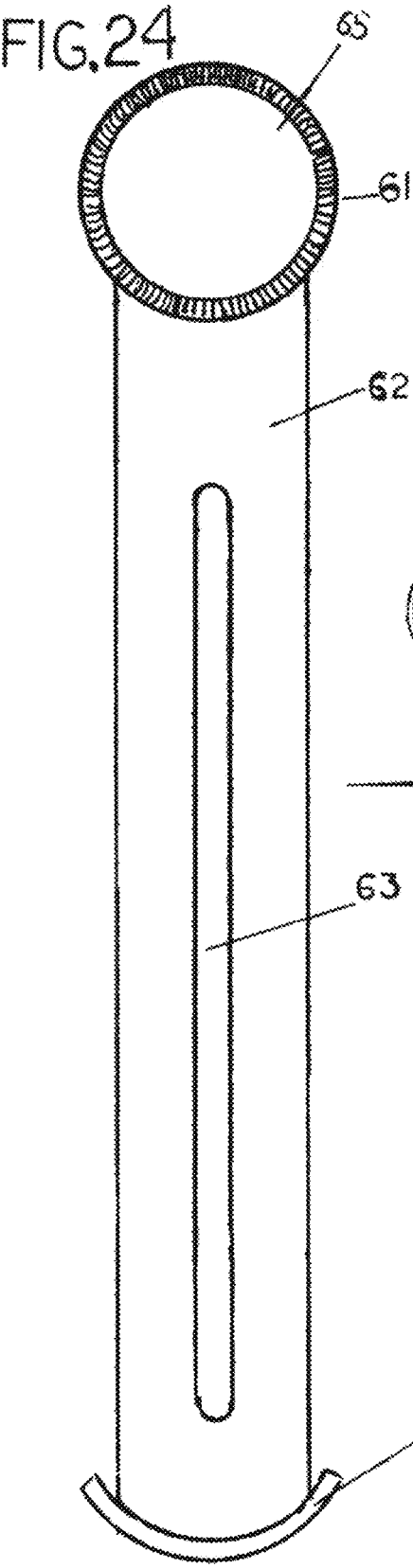
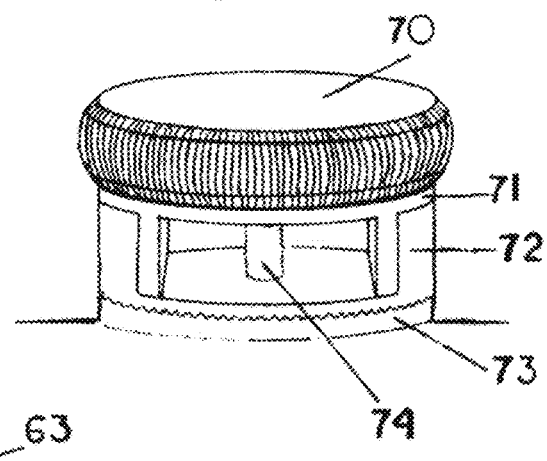
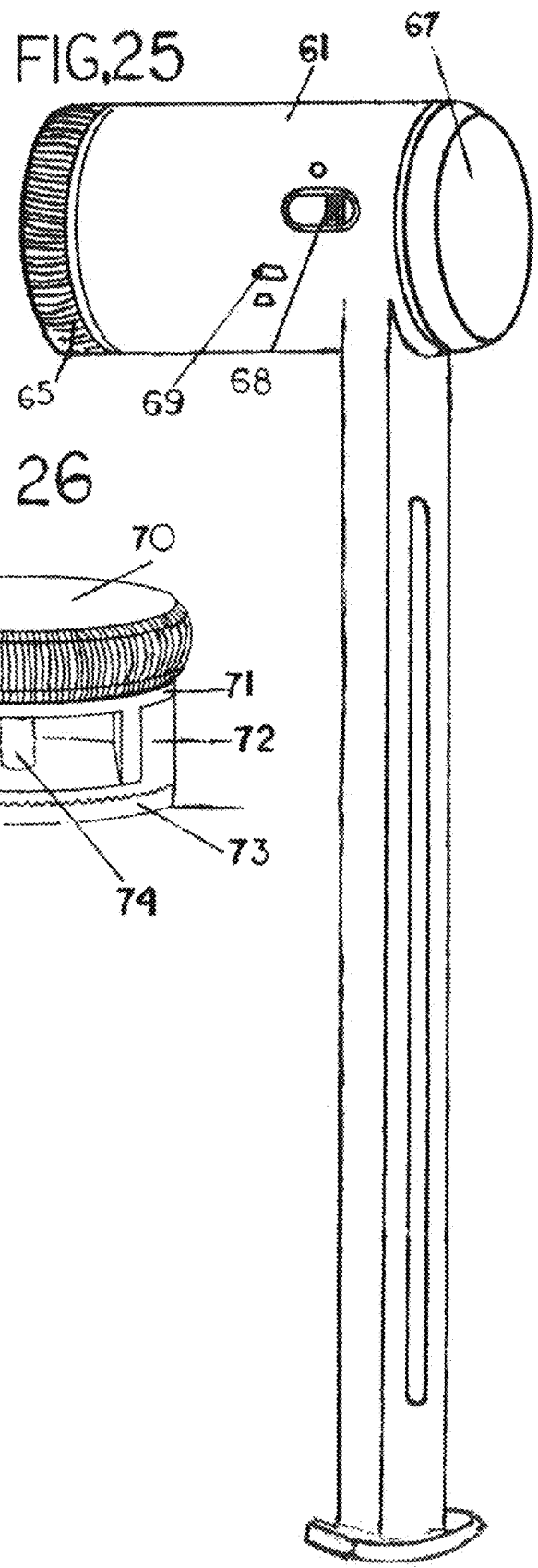

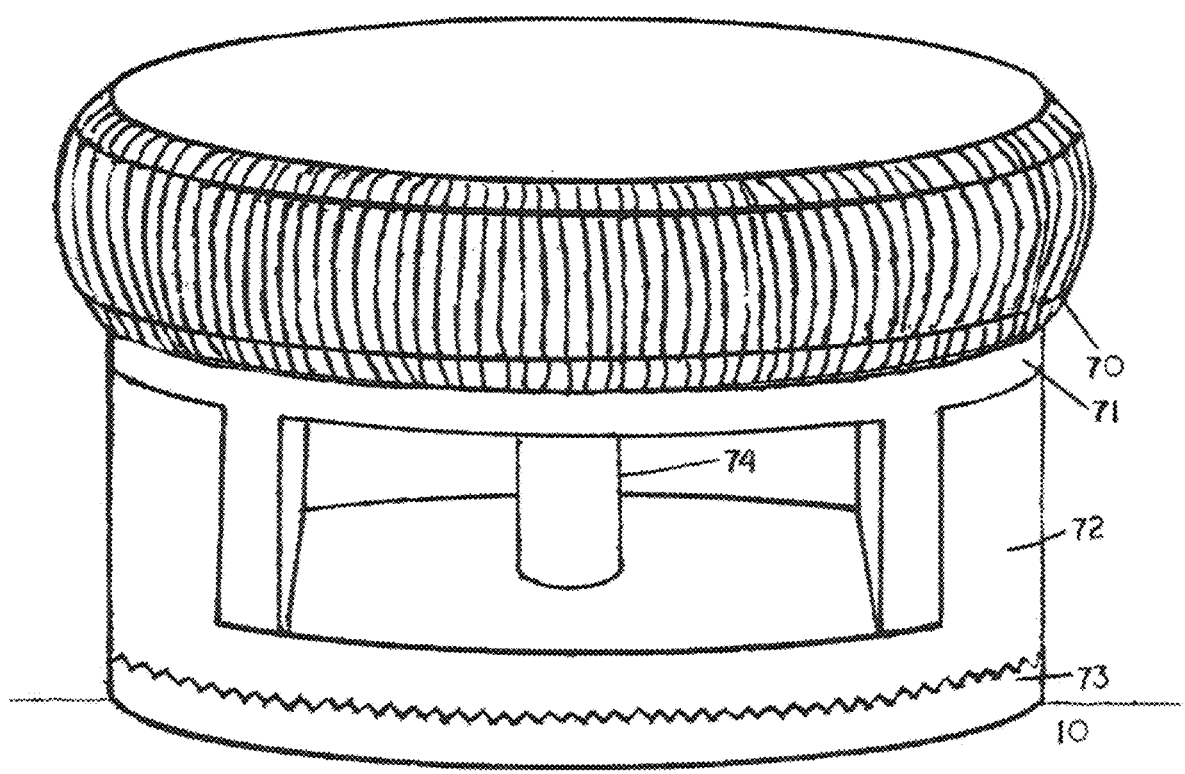

SIGHTING SYSTEM FOR A FIREARM

CLAIM OF PRIORITY

This application is a continuation of U.S. patent application Ser. No. 15/884,067, filed on Jan. 30, 2018, now U.S. Pat. No. 10,359,256, which claims the benefit of U.S. Provisional Patent Application Ser. No. 62/452,986 filed on Jan. 31, 2017, and U.S. Provisional Patent Application Ser. No. 62/467,197 filed on Mar. 5, 2017, the contents of which are incorporated herein by reference.

FIELD OF INVENTION

The present invention generally relates to the field of firearm accessories. Firearm accessories consist of a wide range of devices that attach to and enhance the performance of, or simply work in conjunction with a fire arm, all of which are produced to enhance the abilities of the firearm in one way or another. These accessories consist of various types of sights, scopes, night vision, laser sights, range finders, etc. as well as things like regular or infra-red high-powered lights, tripods, various types of mounting rail systems etc. This invention would fall more into the sight category but more particularly, this device is a new type of camera sight that was primarily devised and engineered to provide the user with the ability to surveil an area at a full radius of 360 degrees from protective cover to alert the user of advancing hostile combatants to locate snipers or other developing enemy scenarios, but basically to provide our combat soldiers with the ability to remain totally behind protective cover while performing some of their least to their most dangerous tasks that unfortunately result in very large percentage of American casualties.

BACKGROUND OF THE INVENTION

This invention is basically in two different embodiments, both of which employ two cameras as well as their own smart phone or smart device mounting platform or mounting base. These devices supply the user with both the target image by means of the forward-facing camera, as well as an image of the area behind the user by means of an additional position adjustable rear viewing camera, that would be an integral part of a position adjustable armature. These cameras are illustrated as two different types that operate and supply the image of the area behind the user in two different manners. One would supply its image to the same smart device that would be mounted in the smart device mount, which is an integral part of this device. The other type of rear viewing camera illustrated in this patent application would be an integral part of its own small smart device, that would simply be much like a very small smart phone or tablet with no communication, internet or Wi-Fi transmitting or receiving abilities, but would simply be a tiny high-resolution camera with both zooming and viewing angle adjustability, as well as possibly recording abilities, like any other smart device that employs a camera. Some of the other differences would include, the type camera that it would employ would possess infra-red viewing abilities as well as a small infra-red illuminator, and would be an attachable part of a position adjustable armature, which would allow the user to position the camera with its own integral viewing screen, in the best operational position to both acquire the best vantage point, for both its rear viewing camera as well as its viewing screen. The cameras lens on this rear viewing would also be on the same side as its viewing screen to, face and receive the image of the area behind the user.

The other camera employed in these camera sights, would be the camera that actually supplies the target image to the smart device mounted on this device. This camera's lens would be positionally mounted in the forward portion of the camera housing in a close enough proximity to its viewing window, to attain a clear wide field of view. Which would prove of great benefit especially to our armed forces, whether using this device for surveillance purposes, or while using this device from behind protective cover, to quickly locate the point of fire, as well as to reveal other dangers such as approaching hostile enemy combatants, or other developing enemy scenarios, that would pose an immediate threat, that the soldier would be in desperate need to be made aware of. Both the forward and rear viewing cameras employed in these tactical camera sights, could be of the exact same type, in that they would both employ high-resolution infrared viewing cameras with Wi-Fi transmitting modules. Although all, except one, of the applicant's prototypes for these camera sights, simply employed higher quality non-magnifying type spy cameras, that employ the same type and quality of cameras as those found in smart phones, although these spy cameras also possess infrared viewing abilities as well as their own WI-FI transmitting modules, which actually lend themselves, and function very well, in these tactical camera sights, and this type of camera may well be still employed in this invention, but most likely restricted to the employment in the rear viewing camera device portions of this invention. In that there are other types of very small cameras that are available with infrared viewing abilities and their own, or are adaptable with WI-FI transmitting modules, of which there are several types to choose from on the market that would all lend themselves well, to be employed in these camera sights, all of which possess certain advantages and disadvantages to each other. The first of which being, the aforementioned type used in most of the prototypes for this invention, being one of the least expensive of these types of cameras. These cameras are available in high resolution of 1080 Pixels and greater, with these cameras also being widely available with their own integral or separate Wi-Fi transmitting module, most of which are available with infrared viewing capabilities as well. A hard wire-able model of this type of camera would be of the type that plugs into the same port on a smart device, which is also used as the charging port. Of course, the main down side to the employment of this type of camera would be the cord. Another type of available camera presently found on the market that these camera sights are also engineered to employ, are what is commonly referred to as a mini block camera which would function in much the same manner as the tiny HD spy camera, with models available with infrared viewing capabilities, as well as WI-FI transmitting or hard wire-able modules. The real advantage to the employment of this type of camera in these tactical sights is that they possess advantages such as much greater resiliency rating and zooming capabilities, as well as other abilities. The down sides to the employment of this type of camera in these devices, firstly would be, that presently they are more cost inhibitive, as well as their physical size being somewhat larger, although this type of camera has recently become available in even much smaller sizes. Electrical consumption has also been seriously reduced as well, which are all factors that would prove these types of cameras to lend themselves well to their application in these tactical camera sights. Yet another type of camera applicable to these camera sights, would of the same basic type, but that possesses optical zooming abilities, which up until now, were somewhat size restrictive, but at this time, are presently available in very small models, that are of a very high quality, that would lend themselves well to their application in these tactical camera sights, with very few modifications to their original design. Some of these very small cameras with optical zooming abilities were actually manufactured as spy and surveillance cameras, and are presently available with or adaptable with WI-FI transmitters, and some available with infrared viewing abilities as well. Yet another option would be to outsource the production of these cameras to camera or camera component manufactures, that would produce these cameras, not only equipped with optical zooming, and all the other components and abilities needed, but that would also be made in the perfect size and configuration that would be an easily installable component of these tactical camera sights during assemblage. The applicant has already contacted and spoke at length with various camera, and camera component manufactures, to estimate price as well as to determine technical options and feasibilities and has determined to equip these tactical camera sights with these cameras, with optical zooming abilities. Which in turn would provide the soldier or law enforcement with the ability to either use these tactical camera sights as a non-magnifying reflex or holographic type of camera sight, that would provide the user with a non-magnified, and very wide field of view in the smart device, mounted in the smart device mounting base portion of this invention, or to optionally use this little device as a variable high powered scope, that presents the image of the target and the surrounding area perfectly centered in the screen of the smart device, behind the reticle, on the screen of a smart phone or smart device. With all of the types of cameras applicable to these camera sights, the ones employed in their final design would probably have to be decided as an executive decision at that time, once all of these factors are considered.

These camera sights are illustrated as two basic types, one of which is a combination smart phone mount and sight adjustable camera sight in which the camera sight transfers its target image to the smart phone or tablet that is mounted in its own mount, which is an integral part of the sight. The other embodiment of this invention is strictly a camera that is height adjustable to receive its target image from various types of target viewing devices that this device would be mounted behind on the mounting rail of the firearm. These target viewing devices such as red dot sights, scopes, etc. mount at different heights off of the mounting rail on firearm, so this camera sight would be mounted at the optimal distance behind, and height above the mounting rail, to obtain the perfect vantage point for the camera that receives its image from these various target viewing devices that it would be working in conjunction with. This camera in turn transfers its image of a nice wide view of the area to the smart phone, with the reticle always remaining perfectly centered in the smart phone or smart device's screen, that is mounted on its own mount, with this mount being an integral part of this device. This mount in turn is rotatable on its own platform, that makes up the upper most portion of the rail mount, that secures this device to the mounting rail of the firearm, and is rotatable there-on, to supply the user with a full 360 degree view, and is secured in and out of its preferred angle of rotation by means of a finger pull, that is simply pulled to unlock the smart device and its mount out of its particular position of rotation, and then released to lock the smart device and its mounting base into its desired position or angle of adjustment. The smart phone or tablet that mounts on both of these embodiments of this camera sight are rotate-ably adjustable to any angle, allowing the user to position the smart phone or smart device to any viewing angle. This, along with this invention's additional rear viewing camera, provides the user with the ability to rotate the smartphone and lock it into any desired angle, to surveil the area by viewing the image provided by the camera sight to the smart phone from any position that the user would need to position himself, in relation to the firearm, to remain behind protective cover. This is done while maintaining a full visual of the area behind the user at the same time, with the use of the rear viewing camera that would be made as an integral portion of this rotatable smart phone mount, with the camera portion of this device always receiving its image of the area 180 degrees from the image provided by the camera, mounted in the forward viewing camera sight portion of this invention, or in other words, providing the user with a view of the area behind the viewing screen, of the smart device mounted in the smart device's rotatable platform.

This would provide the user with the ability to remain totally behind protective cover while surveilling an area for things like developing enemy military scenarios, advancing hostile forces or to locate sniper positions etc., without suffering loss of any of the functions and abilities of the rest of the firearm while doing so; this all from a safe secure position from protective cover such as from behind tree, building, vehicle, wall or other. This function provides far more than the ability of just the viewing angle of the smart phone screen to its best vantage point when using the smart phone screen as a sight screen, when using the fire arm in the conventional manner, but far more importantly, this feature, and this device for that matter, was devised to provide the user, primarily our military or our soldiers and law enforcement, with a level of safety that has never been availed to them up to this point, especially in some of the combat scenarios a soldier would constantly and unavoidably find himself in, that his only remedy to saving his own life as well as the lives of his fellow soldiers, would include placing himself in a position of serious danger to accomplish the tasks unavoidably required of him, historically resulting in a tremendous amount of U.S casualties. These combat scenarios include situations such as when a squadron group on patrol or an individual soldier or officer of the law for that matter, comes under enemy fire and has to quickly take cover behind buildings, armored vehicles, trees or other, and shortly thereafter, must surveil the area to locate the source of fire, as well as to determine and locate other dangers, such as other advancing hostile forces, secondly to access the threat and take appropriate action to deal with it. Up to this point these necessary actions required the soldier or officer of the law to commit, or in other words, to stick his head out from behind protective cover to do so, which the enemy then knows where the soldier is and is just waiting for him to do so, which creates a far too common extremely dangerous problem for the soldier that rarely ends well for anybody, in that the soldier knows that he must apply extreme haste to accomplish the task required of him. Sadly, in urban theaters of combat, a lot of collateral damage or the loss of non-combative civilian lives are lost as well, in that split second that the soldier or law enforcement has to expose himself as a target, because of the level of danger involved, this action is done in extreme haste which results in the expending of a tremendous amount of usually fully automatic fire power on anything that moves, believing it to be the enemy. Sadly, at times, severe haste created from the lack of their ability to remain behind protective cover and remain in control of a very common situation of this nature, not only results in the loss of the soldier's life, but can result in collateral damage or loss of life of the innocent as well.

Other extremely dangerous combat scenarios include various types of surveillance or patrol where a soldier has to constantly be exposed as a target. Unfortunately, these types of problems and dangers are radically compounded and become much more dangerous in theaters of urban combat, in that a large percentage of the enemy can take up hidden or sniper positions, which present some extremely dangerous scenarios and challenges for today's combat soldier as well as our military leaders, trying to complete military objectives with the fewest number of casualties possible.

The cameras employed in these camera sights have infra-red viewing abilities, along with infra-red illuminators that they are equipped with, that provide the image to the smart phone or smart device's screen mounted in this device, providing the user with a full clear view of the area whether at night or day. The employment of a smart phone or smart device in these devices provide this device with a tremendous number of other abilities as well, such as the use of sighting apps designed to use with the device, as well as the use of GPS, not only to maintain location knowledge of all of our troops, but also to call in locations of enemy troop movements, as well as, to stay in communication with their squad leader or command center, to call in precise locations of enemy locations or movements either while under heavy attack, or simply from positions, of surveillance. This along with the wide range of cameras and other components that this device is designed to employ, such as cameras with extremely high resolution of 4 and 5×, as well as other image enhancement abilities, or yet other types that also possess optical zooming abilities which also optionally turn these camera sights with no-magnification into variable high-powered scopes. This, along with all of the cameras employable in these camera sights having infrared viewing abilities, and being equipped with infrared illuminators, give these sights amazing night viewing abilities as well. All of this and more, with a tiny device only approximately 2×3" inches in diameter and that weighs only several ounces, that would not only add very little weight to a soldier's already heavy load, but when all of the bulky and heavy equipment that this invention could very effectively replace is figured into the equation, this device could actually significantly lighten the soldiers load while providing him or her with a level of safety and control, that nothing up to this point has ever come close to providing them with in the past.

Since the applicant originally came up with the idea for these tactical reflex or red dot type camera sights for our military and law enforcement, it was for the main purpose of providing them with the ability to remain safely behind protective cover if they come under enemy fire, while remaining in total control of the conflict, but shortly after, the applicant started coming to the realization of their many other safety providing abilities, most importantly being the level of safety that these camera sights would provide our combat soldiers, while performing almost all of the duties required of them in various theaters of combat. Levels of safety, which up to this point have never been available to them in the past, to much more safely perform a wide range of duties consisting of some of their least to their most dangerous duties, which unfortunately, result in a very large percentage of American casualties.

It is well appreciated in the art of weaponry and particularly rifles and hand guns. There have been numerous attempts to develop more efficient firearm accessories that provide a soldier with a level of safety and control in theaters of combat where gun fire must be exchanged to the preservation of the soldier's life, in that first responders, soldiers, and law enforcement personnel often encounter hostile combatants, violent actors, or offenders who carry pistols, rifles, or other weapons. In military scenarios, battles and other military operations often occur in urban theaters of combat requiring armed forces to patrol and engage in battle in towns and cities, with personnel on patrol in theaters of combat, and if under fire from the enemy, must regularly take cover behind obstacles such as buildings, vehicles, trees, homes, etc. with the remedy to these scenarios being extremely dangerous, that rarely end well. The problem is that with the friendly combatants' entire body being behind protective cover, a clear lineal view to locate the point of fire, or be able to locate or accurately engage advancing hostile enemy combatants, when it's the only option to the soldiers survival, cannot be accomplished without looking over or around these fortified structures, exposing himself as a target while doing so. This, or to even change positions or to transverse from one location to another, the soldier must peek around corners of buildings or other objects to access the dangers in the path he must take, exposing himself as a target while doing so. Known statistics establish that a large percentage of American casualties occur on the battlefield while doing so, especially in theaters of urban combat which has presented all new dangers and challenges for today's soldiers. The ability to see and to be made aware of these dangers is vitally important to their very survival.

Current available solutions to this problem found in the prior art that actually accomplish the task of supplying a soldier with the ability to effectively both surveil an area while maintaining the accurate use of a firearm, totally from behind protective cover without exposing any part of the user's body to incoming fire while doing so, are very few, with most engineered to complete either one of these tasks or the other; to either be used for surveillance purposes or their primary function being just to accurately engage the enemy from a safer position, rarely with any of them doing either well. With only one known device that that performs both of these tasks with any degree of efficiency. This being the Israeli Corner Shot which consists of three models, two of which consist of a pistol mounted on the forward portion of a ratcheting bendable stock; the third being a single shot 40-millimeter grenade launcher that is simply mounted to this ratcheting bendable stock in place of the pistol. This firearm also has a video camera with a super imposed reticle that is wired to a 2½-inch monitor with a LED screen that is simply put into service by locking the sight screen into its non-rotatable 90 degree viewing position in relation to the rifle stock, viewable at lower portion of the left side of the firearm stock that the camera supplies its target image to. The ratcheting bendable forward portion of this firearm that the pistol and camera with its superimposed reticle is mounted to, is pivot-ably connected to the stock portion and swings and is lockable to either side of the firearm, to surveille the area for potential dangers. This, as well as to engage same if deemed necessary. This tactile firearm I'm sure, saved a great many of our troops as well as our ally's troops' lives, since its inception but even this tactical firearm in spite of its successes along with all of the rest of the prior art for that matter still suffer from a great many deficiencies as well. That prove evident many ways. That additional forethought and a wider conceptional vision of the overall needs, along with greater effort was put forth, along with innovative engineering, directed towards the development of a device with a greater range of application, versatility, cost effectiveness, and adaptability as well, to provide a greater range of services and abilities that would actually fulfill the overall needs of our armed forces. Which holds true in all of the prior art. Resulting in restrictions in the level of safety, control, and protection providing abilities that they actually provide to our troops. For instance, the Israeli corner shot being an entire firearm with all of its components being exclusive to itself, and with its firepower limited to the fire power, range, and accuracy being limited to only what a pistol can provide. For this reason and others, this firearm is also seen and used by the military, only as a secondary or specialty firearm and not to take the place of a soldier's primary firearm meaning that this entire firearm would have to be carried into battle along with the rest of the soldier's equipment, not only adding an additional eight and a half pounds to the soldier's existing heavy load but also getting in the way when not in use. But because of these things, also limiting the soldier's range of mobility, and abilities, and thus hindering the soldier's effectiveness in the use the rest of the equipment availed to him, hindering him in the performance of other duties required of him. This firearm is also limited in the positions that a soldier must place himself to the effective use of the firearm due to the location and non-position-ability of the target screen, which can present a problem in some of the more restrictive places a soldier would have to position himself to remain out of the line of fire, while maintaining full effective use of the firearm's tactical abilities. This tactical firearm, as well as other prior art, provides no abilities to the user to maintain a visual of the area behind the user to provide advanced warnings of things, like developing enemy scenario's, or advancing hostile combatants or other dangers approaching from the rear.

The main problem with this tactical firearm, as well as what almost all of the prior art suffers from, is that the current solutions are extremely lacking in their range of versatility, adaptability, as well as their very restrictive range of use, resulting in restrictions in the level of safety, control, and protection providing abilities that they actually provide to the user. Most of these current solutions also consist of multiple, bulky, heavy, high tech, and very expensive electronic devices, and components that not only take up space, but also add much additional weight to a soldier's existing heavy load. Most of these current solutions restrict their own range of versatility by doing things like engineering them in a way that these devices are exclusive either to themselves, and are manufactured as an integral part of a particular firearm, or exclusive to one type of firearm. The prior art's severe lack of versatility, in its lack of ability to be adapted to the many different types of firearms availed to our armed forces, such as the numerous types of rifles, whether standard issue or the various types of specialty and automatic rifles and pistols to even R.P.G.s and grenade launchers, that would greatly benefit from and are in desperate need of these abilities, the prior art has failed to supply.

These current solutions' exclusivity to themselves create other problems as well with their combinations of very expensive high-tech electronic components that are exclusive to themselves which not only limit versatility and range of application but also create additional problems of dependability, in that all of these components are dependent on each other to work as a functioning unit. These solutions, even with all of their very expensive high-tech complexity, are still found lacking in their overall technical abilities. That forethought and innovative engineering in the incorporation of a common smart device may have been a better choice as an electronic and technology source if possibly applicable to their solution, which possess the abilities to better provide the services that their specially manufactured, very expensive and exclusive components provide, but they would have also significantly brought down the cost of these prior solutions while enabling them with a vast number of other extremely useful abilities, as well as their range of use and most importantly, possibly the range of safety that they could have possibly offered the user.

Of course, no degree of electronic sophistication can make up for a lack of vision, innovation, forethought and creative engineering. But the added abilities of a very high-tech computer, which a smart device actually is, can radically expand other electronic devices' abilities, if applicable to their solution, and initially engineered to integrate into their solution. Furthermore, not only are these other current solutions very expensive because of their complexity and expensive and exclusive components that are exclusive to themselves, not only limits their versatility, portability and range of application but also creates additional problems of dependability, with all of these components being dependent on each other to work as a functioning unit, which even adds additional expense of the cost of repair, service, and maintenance of these systems, quite often making them unaffordable for most small entities such has militias, micro-states, police departments, or even our own military for that matter, when the number of these other current solutions needed to properly supply our troops are considered, and the price of doing so.

All of the prior art exhibits problems or deficiencies of one sort or another, almost all are not only found lacking in their range of versatility, applicability, and portability but also in their range services, both tactical, and non-tactical that they actually provide to the user.

There are several known lower tech mirrored mechanical solutions as well which include rail mounted rotatable split beam mirrors that allow the user to view the target image provided by the red dot sight as the image is split and viewed from two positions from two small viewing ports or windows located at exactly 90 degrees to the firearm so that the user can view the target image but only from exactly 90 degrees to the firearm, and the other one located directly behind the red dot sight when using the firearm in the conventional manner. This restricts the view of the target image acquired by the red dot sight to a certain extent in that these red dot sights come with a variety of viewing window sizes, most of which are much larger than the one on the device. Split beam mirrors also have inherent problems such as image displacement, ghost imaging, problems with reflective light, and others.

Other known mirrored mechanical solutions consist of a rail mounted fold up mirror that, when folded up and put into service, this mirror does not fully rise to an angle of 90 degrees but rather stops into use at a much lesser angle. This restricts its range of use or positions that the user would have available to place himself in relation to the firearm and maintain a clear line of vision to the target image provided by the sight that this device is working in conjunction with. Another problem is that the mirror has an angled base, when this mirror is laid down into a position of non-use on top of the upper platform of this device, where the mirror assembly is rotatably coupled to the lower rail mount and the angled base of the mirror assembly lays over the hinge that connects the mirror assembly to the lower rail mount when this mirror assembly is put into a position of non-use. The device sits at an even higher profile off of rail mount restricting more of the target image provided by the sight or further restricts the height requirements of the target viewing device it is working in conjunction with when this device is locked down in a position of non-use. On the back side of this mirror, is an iron sight that is an integral part of the back side of the mirror assembly that automatically comes into service that when the mirror is lowered and locked into a position of non-use. This iron sight is advertised as an aid to the user to find the reticle provided by the sight of the accessory device. The problem is that this iron sight is not removable and it blocks a large part of the target image in that this iron sight extends up into parts of at least one half of the red dot sight's viewing window where target image provided by the red dot type sight is acquired by the user. This iron sight with all of its target acquisition restrictions would also, in most cases, prove to be of no use when used in conjunction with most of the red dot type sights in that most of the newer red dot type sights produced today are parallax free type red dot sights. In a parallax free sight, the reticle and the target image remain true to each other no matter what position the user is viewing target image provided by the sight, and not only would this part of the mirror assembly block a large part of the target image, but in most applications it would prove to be of no use. This device, as well as the aforementioned mechanical solutions, mount on the firearm's weapon rail at one height on the rail and the red dot sights they work in conjunction with, all mount at various heights on firearm's rail mount which renders these devices unusable unless the sight that it is being used in conjunction with mounts at the same height on firearm's mounting rail. Many of these red dot sights are also made for fast, easy target acquisitions and with reticle in sight to be easily viewed from angles that these devices would not allow the red dot to be viewed from, which would further restrict the overall function of the sights and restrict the view of the surrounding area when trying to locate targets using firearm in conventional manner. These devices are not only very limited in their range of use but they also hinder these red dot sight's abilities when using them in the conventional manner. The biggest problem with all of these devices that receive the target image from a mirror or reflective device is that it reverses the target image which makes the ability to accurately aim and fire the firearm relative to the target while using these devices extremely difficult, if not impossible, without considerable practice on the firing range.

Other known devices offer no tactical solutions but use a smart phone for target acquisition and/or display that mount on a rifle. One such device is by Intelliscope™, and is simply a smart phone mount that attaches to a weapons rail and uses the camera on the smart phone, along with sight apps that are programmable into the smart phone, solely as its sighting device. The problem with using the smart phone camera as a sight in this manner is a serious lack of accuracy that can be acquired in this manner. The device is made mainly for paint ball guns or novice shooters. Another device also offers no tactical advantage but uses a smart phone to acquire a target image form a scope on a firearm. This device consists of a smart phone mount with a bracket or clamp that attaches the smart phone in this mount with the camera on the smart phone in the vantage point to view the target image provided by the scope through the back lens of the scope. The target image is viewed on the screen of the smart phone but this device is very limited in its range of use and versatility in that this device is made to be mounted exclusively on high powered scopes and it does not give the user any tactical advantage to the use of the firearm as well and are used primarily for hunting purposes.

Applicant's present invention is a device that avails the user with the full use of the firearm, from a safe, secure position, superior to the high tech, highly complex and extremely expensive current solutions, even though applicant's core device is relatively simple and inexpensive to produce. This, while at the same time, provides the user with a far greater number of services and far superior abilities, many of which are actually much higher tech services and abilities, than the prior art. This is accomplished with this camera sight system's innovative engineering and mode of operation, working in conjunction with a common smart device, which is in fact actually a very high tech and complete computer, into this camera sight system's engineering and design. This, along with the applicant's development of a new type of camera sight and camera sight system that enables the user, primarily our military, to complete tasks and achieve objectives with a small relatively simple device that the user uses in conjunction with his own smartphone that provides him with a new level of safety and control as well as with a large number of new abilities that has never been availed to them in the past, with a device that is mountable on any firearm, with this invention's smart phone or tablet mount's ability to rotate and lock into various positions so that the target and surrounding area's image provided by this device can be viewed from basically any position the user would place himself in relation to the firearm. This along with the target image always remaining positioned perfectly centered in the smart phone or smart device's screen behind the reticle, provides the user with extremely fast and easy and accurate target acquisition. This, along with the added abilities that the secondary camera, that its mount is an integral portion of the back side of the smart phone mount on these devices, that provides the user with the ability to maintain a continuous visual of the area behind the user at all times to see approaching hostile combatants or other developing enemy scenarios, will probably prove to save many lives as well.

Another added advantage of using a smart phone or small tablet as a viewing screen adds tremendous sighting abilities as well, in that instead of having to find the target by looking through what's usually only approximately a 1 inch to a 1⅜ inch viewing window in a reflex type sight or scope, and then having to find and line up the target with the reticle, as well as locating the target in the first place with a very small and restricted field of view, is both ineffective as well as time consuming, when time is very critical. These camera sights on the other hand operate in a completely different mode with the target reticle always remaining perfectly centered in the smart device's screen, with the smart device's camera providing the user with a full, wide field of view of the surrounding area, providing the user with extremely fast and accurate target acquisition, in that all the user has to do is center the target in the smart phone screen behind the reticle. The camera sight's wide field of view also provides the user with the ability to locate and access other potential dangers as well, such as advancing hostile forces, developing enemy scenarios, sniper positions, etc. This, with the user's entire body remaining behind protective cover while doing so. This, along with the smart device's mounts' ability to employ any type or size of smart phone, as well as smaller tablets, further enhances this device's overall range of versatility.

Applicant's device also offers the user many additional tactical and non-tactical advantages as well, such as the ability to also use this device in conjunction with other smart devices, such as computer watches, such as iWatch or computer glasses such as Google Eye, or computer goggles, as well as large computers to sight—in the device.

Applicant's device also has night vision capabilities as well, when using this device in conjunction with its infrared illuminator engineered into this invention that works in conjunction with the infrared viewing cameras that this camera sight employs. There are several available types of cameras on the market employable in these camera sights and all of which are available with are or adaptable with infrared viewing abilities for night vision capabilities. All have other advantages and disadvantages to each other, consisting of things like cost, size, power consumption, and abilities, with one of these more cost inhibitive options possessing very high resolution and separate but transferable zooming abilities, although the zooming controls would actually be on the camera sight portion of the device itself, rather than controllable on the smart device's screen. The zooming abilities of this device provides this camera sight system initially with no magnification, into a variable high-powered scope, allowing the user to zoom in on sniper positions or to view developing enemy scenarios or advancing hostile forces, or simply for more accurate sighting abilities from a distance, etc. This, with the user's entire body remaining totally behind protective cover while doing so, as well as other sight enhancing abilities, such as the application of sighting applications, as well as features including the smart phone or tablet's ability to record photos and video for evidentiary use and maintain communication with other personnel. Also, using GPS to report enemy positions or call in air strikes, etc. Also, the target image can be brought up on a regular computer screen such as a laptop, that, when device is being sighted in or when the sights that this device is being used in conjunction with are being sighted in, the target image can also be enhanced in many other ways so that this device can be used to sight itself in. This, as well as other numerous non-tactical uses.

Applicant's present invention is a device that avails the user with the full use of the firearm, from a safe, secure position, superior to the high tech, highly complex and extremely expensive current solutions, even though applicant's core device is relatively simple and inexpensive to produce. This, while at the same time, provides the user with a far greater number of services and far superior abilities which are actually much higher-tech services and abilities, than the prior art. This is accomplished with this camera sight system's innovative engineering and mode of operation, working in conjunction with a common smart device, which is in fact, actually a very high tech and complete computer, into this camera sight system's engineering and design. This, along with the applicant's development of a new type of camera sight and camera sight system that enables the user, primarily our military, to complete tasks and achieve objectives never achievable by them in the past, by providing them with a large number of new abilities that has never been availed to them in the past, with this invention.

SUMMARY OF THE INVENTION

The embodiments of the invention described herein are basically the core rail mountable camera sight and smart phone or tablet mount, with a secondary camera and mount integral to the back of said smartphone mount. The smartphone or small tablet mount on this camera sight rotates and locks into various positions or angles of use to view targets and the surrounding area from any position the user could position himself in relation to the firearm with the first one having an integral vertically adjustable camera, with both embodiments of this invention possessing its own Wi-Fi transmitting module. These devices could also be made in a model that transfers its image to the smart device by wire. Both embodiments of this device possess infrared viewing capabilities, with the first embodiment of this device, possesses an integral vertically adjustable camera with infra-red viewing abilities that acquires its target image from various other target viewing devices on firearm such as reflex sights or scopes, thermal optics devices or other night vision devices or other. that would be mounted at various heights on firearm's weapons rail and transmits its image to the smart phone or tablet that is mounted on this device; the second embodiment of this invention possesses a sight adjustable camera sight and infrared viewing capabilities that transmit its own highly accurate sighted-in target image to either a smart phone or tablet that is mounted on this device. Both of these embodiments of this device also are equipped with an additional camera that would be one of several optional types, all of which being an integral part of, or attachable to, an armature that is adjustable both in height and angle that is provided to positionally adjust this camera's position to attain an unobstructed view behind the user at all times, with either a camera that transfers its image to the smart device and is viewed in a window or split screen on the smart device's screen or with another camera design option for this rear viewing camera which consists of a camera with its own tiny LED screen. This device would possess many of the same abilities of a smart phones camera, but its camera would be wired into the rest of the components of this rear viewing device, and would be fully operational as a complete unit. This invention also transmits the target image to other smart devices that can be used in conjunction with this device at the same time such as computer watches, such as Watch, computer glasses such as Google Eye or computer goggles, laptops, tablets, or any other Bluetooth device of that matter.

There are several available types of cameras on the market employable in these camera sights and all are available with infra-red viewing abilities for night vision capabilities. All have other advantages and disadvantages to each other, consisting of things like cost, size, power consumption, and abilities, with one of these more cost inhibitive options possessing very high resolution zooming abilities, although the zooming controls would be on the camera sight portion of the device itself, rather than controllable on the smart device's screen. But the zooming abilities of this device provide this camera sight system initially with no-magnification into a variable high-powered scope allowing the user to zoom in on sniper positions or to view developing enemy scenarios or advancing hostile forces, or simply for more accurate sighting abilities from a distance, etc. This, with the user's entire body remaining totally behind protective cover while doing so.

The main objective of this present invention is to provide our troops, law enforcement and others with a level of safety and control providing abilities not limited to the ability to surveil areas or the ability to locate and engage hostile enemy combatants while under fire from same, or when absolutely necessary to the survival of our troops, while remaining totally behind protective cover. But also, with the numerous other, safety, providing abilities over hostile forces, enemy combatants, violent offenders and the like that would threaten the lives of the innocent, as well as to save a great many lives of our troops and law enforcement and others that put their lives on the line every day, in their never-ending battle against the evil forces that would threaten the freedom, safety and lives of the people of this great nation.

Another objective of this present invention is to provide accessory smart phone or smart device mounts and superior sight systems for firearms that are secured to the mounting rails of any type of firearm, that are adjustable and rotatable for multiple configurations, to accurately use the firearm from any position the user could position himself in relation to the firearm.

Another objective of the present invention is to provide improved firearm accessory mounts and sight systems for firearms that provide and improve the viewing of targets through primary firearm sights on the firearm and the target image of its own sight adjustable camera sight, on the screen of a smart phone or other smart device's screen that widen the field of view and maintain the camera sight's camera lens in perfect lineal alignment with the firearm sights and reticles, or the target image provided by its own sighted in camera sight in the device, upon rotation of the smart device mount.

It is another objective of the present invention to provide improved firearm sights and smart phone mounts for firearms that improve viewing of targets either through primary sights on the firearm or its own sight adjustable camera sight with the smart phone or tablet rotated into various viewing positions relative to the firearm, thereby providing the user with a wide unobstructed view of an area providing the user with the ability to surveil an area in a theater of combat to reveal origins of incoming fire, advancing hostile combatants, developing enemy scenarios, sniper positions, etc. as well as to accurately engage same if absolutely necessary, if the threat presents an imminent danger to our troops and the decision is made to do so. This, all from a safe, secure position with the user's entire body remaining behind protective cover such as from behind walls, trees, buildings, vehicles, trenches, berms etc. without exposing the user as a target while doing so.

It is yet another objective of the present invention to provide an improved firearm accessory that is a smart phone mount and sight systems for firearms that improve viewing of targets through the primary firearm sights on the firearm or of the target image provided by the device's own sight adjustable sight that provides advanced targeting abilities with a wide field of view of the target image and surrounding area, with the target reticle always remaining perfectly-centered in the smart device's screen to the smart phone or smart device that is mounted on this accessory that is cost effective and operationally efficient.

It is yet another objective of the present invention to provide a more efficient improved and superior accessory or smart phone mount and sight systems for firearms that provide the user with a wide view of the surrounding area acquired by means of the camera lens in this invention, mounted far enough forward in the sight housing and close enough to the forward viewing window behind the reflected reticle to acquire a full wide unobstructed view of the target image and surrounding area with the sight's target reticle always remaining perfectly centered in the smart device's screen.

It is yet another objective of the present invention to provide a soldier with a view of his entire surroundings including the area behind the user to provide our troops with the ability to monitor advancing enemy troops, or other developing enemy scenarios or impending dangers from in front or to either side of the user while maintaining a constant visual of the area behind the user at the same time, to alert the user of approaching dangers from behind, as well as from a position of full protective cover It is yet another objective of the present invention to provide a soldier or law enforcement with a view of his entire surroundings including the area behind the user, from full protective cover at night as well as during the day, with very effective night viewing abilities.

It is yet another objective of the present invention to provide advanced firearm sights and firearm sighting systems, for firearms that provides the user with all of the advanced sighting, and sight enabling abilities, that a smart device, which is in fact a full computer, provides to this new type camera sight system.

Its yet another objective of the present invention to provide advanced firearm sights and firearm sighting systems for firearms that are small and, light, yet possess a wide range of abilities that are also highly versatile, quickly and easily attachable, portable and more importantly, applicable to any type of firearm.

Finally, it is an objective of the present invention to provide an improved accessory smart phone mounts and sight systems for firearms that incorporates all of the above-mentioned functions, objects, and features.

In accordance with these and other objects which will become apparent hereafter, the instant invention will now be described with particular reference to accompanying drawings.

BRIEF DESCRIPTION OF DRAWINGS

FIG. 4 is a drawing of an overhead view of a bottom portion of the rotatable portion of the invention, consisting of the smart device mount, which is also part of the platform that rotates around the camera, and battery housing #4, that is also integral to the finger pull shaft and spring housing for the finger pull (shown as transparent) in its first embodiment, being a height adjustable camera in its own housing integral to a rail mount, that is also integral to a rotate able smart device mount in accordance with the principles of the present embodiment.

FIG. 5 is a drawing of a top view of the ball bearings and bearing race that mounts between the top bearing race of bottom portion of the rotatable portion of the invention consisting of the smart device mount which is also part of the platform that rotates around the camera and battery housing #4 and the threaded bearing race and collet #5 (not shown) in accordance with the principles of the present embodiment FIG. 6 is a drawing of the bottom portion of the bearings #21, and bearing race #22, that are an integral portion of the rail mount #14, and height adjustable camera and battery housing #4, that the bearing race portion of #4, would ride and rotate on, in accordance with the principles of the embodiments of the present invention.

FIGS. 7A,B,C,D are drawings of the same basic components of FIGS. 4,5, and 6, the difference being that the ball bearings and races have been replaced with inset hard smooth plastic rings made out of a material such as Delrin or other, the camera and battery housing #4, are drawn as if removed in this drawing although housing #4, is actually part of the rail mount portion of this device and is not actually removable, but simply illustrated in this manner to view the smooth surface #14, that the inserted bearing #32, rides on. FIG. 7A is a view of top surface of the rotatable base and smart device mount and FIG. 7C is a view of the bottom surface of the rotatable base and smart device mount. Once again the finger pull housing #6, is shown as transparent to view the inner workings thereof. FIG. 7D is the rail mount that's part of camera and battery housing as well not shown, in accordance with the principles of the present embodiment.

FIG. 8A is a drawing of an overhead view of the a bottom portion of the rotatable portion of the invention consisting of the smart device mount which is also part of the platform that rotates around the camera and battery housing #4, although this component of FIG. 8A as well as the threaded collet of FIG. 8C are the same in both embodiments of this invention, in accordance with the principles of both embodiments of this invention.

FIG. 8B is a drawing of the bottom portion of the bearings and bearing race that are an integral portion of the rail mount and height adjustable camera and battery housing #4, that the bottom bearing race #22 portion as seen in FIG. 4 of the platform and smart device mount portion of this invention of FIG. 8A would ride and rotate on, in accordance with the principles of the embodiments of the present invention.

FIG. 8C is a drawing of a top view of the threaded collet and bearing race that threads down around the bottom portion of the camera sight and battery housing #4, and tightly secures the ball bearings into all of the bearing races and is locked in place by means of a set screw in the set screw housing #20, in accordance with the principles of the embodiments of the present invention.

FIG. 9A is a drawing of an overhead view of the device. The smart phone mount which would be an integral part of base plate, #3, shown in this illustration as rotatable around the battery compartment, the height adjustable camera assembly and Wi-Fi transmitting module, as well as the mechanisms that raise and lower them, so that the camera can be adjusted at the proper height to acquire the best lineal view or vantage point of the sights on the firearm that it is working in conjunction with in accordance with the principles of the present embodiment.

FIG. 9B, is a drawing that shows the cover plate, #18, which is to be installed and sealed to the top of the camera and battery housing, #4, as well as, the battery compartment lid #25, in accordance with the principles of the present embodiment.

FIGS. 10A and 10B are a drawing of simply magnified views of the top of the camera sight and battery housing and its gear assemblies seen and described in FIGS. 9A and 9B with base plate of the gear housing, #28, with gear assemblies removed from shafts, #9 in accordance with the principles of the present embodiment.

FIG. 11 is a drawing showing the gear housing base plate, #28, mechanically fastened in place, as well as the gears fastened to the tops of threaded shafts, #9, and the center gear, which is turned with height adjusting knob set in place in accordance with the principles of the present embodiment.

FIG. 12A through FIG. 17 are drawings of this invention in its second embodiment, which is a non-height adjustable, but sight adjustable HD infrared viewing camera with its own Wi-Fi transmitting module that transmits its sighted-in target image and reticle image to the smart phone or tablet that mounts to this device. This embodiment of this invention works independently from other sights on the firearm so that the camera sight and smart phone or tablet work together as a complete unit. FIG. 12A shows the camera sight housing as if the housing was transparent, so the inner workings of the camera sight can be viewed. Number 57 in FIG. 12 A is the dotted line indicating the projected reticle beam that is reflected off the inside of the sight window, #58, directly in front of the camera lens of the infrared viewing HD camera, #1, so as to acquire a full wide view of the surrounding area, with the target reticle, that when this sight is sighted to target, the camera is perfectly sighted in to the target behind the projected reticle, so that the target image is transmitted to the smart phone or small tablet mounted on the camera base plate with target image appearing in the perfect center of the smart phone or tablet screen behind the reticle in accordance with the principles of the present embodiment.

FIG. 12A is a drawing showing a profile view of this device in its second embodiment with the infra-red illuminator #43, and rear viewing camera #78, and battery compartment and viewing screen housing #77, in accordance with the principles of the present embodiment.

FIG. 12B, is a drawing that shows both the front and back side of this smart phone or tablet clamp that is loosened and tightened into place with a thumb screw, #12. The threaded rod, #12, is extended through the hole in the top of clamp #15, and is threaded through a threaded collet located in the upper inside portion of the inside top of the clamp housing, located just behind the camera mounting base plate (not seen). This clamp housing and smart device mounting base are integral and part of each other. This smart phone or tablet clamp is the same as seen and described in FIGS. 2B and 2C in accordance with the principles of the present embodiment.

FIG. 13 is a drawing of the camera sight as if none of the components of this device were transparent, so the entire device can be viewed as true to its image. Number 41, which was not illustrated in FIG. 12 A, is the lateral or horizontal sight adjustment for the camera sight. Number 61 is the camera, WI-FI transmitting module and battery housing, which also would house the on/off switch, indicating light, etc. Note, thermal optics could be added as an integral part or attached to this camera housing as the wire for same would simply be plugged in at the charging port of the smart phone, not shown.

FIG. 14 is a drawing of the front view of the camera sight in its second embodiment that functions as a complete unit with its own sight adjustable camera sight seen in all FIG. 12 A through FIG. 17. This drawing shows this device with the rear viewing camera and armature removed from the device in accordance with the principles of the present embodiment.

FIG. 15 is a drawing of an overhead view of the camera sight with the smart phone or tablet mount rotated around to a forward position off to the side of the firearm, in a position where the battery lid, #28, is removed to reveal battery, #26. This could have one or more batteries in accordance with the principles of the present embodiment.

FIG. 16 is a drawing of a view of the device with the smart phone or small tablet mount rotated to approximately 90 degrees and locked into position to provide a full profile view of the device as well as a view of the back side of the smart device mount in accordance with the principles of the present embodiment.

FIG. 17 is a drawing of the device with a smart phone mounted on its smart phone mounting baseplate with the smart phone rotated around to, and locked into a positon of approximately 90 degrees to the weapon's rail, in accordance with the principles of the present embodiment.

FIGS. 18 and 19 are drawings of this invention in a non-tactical version, with a sight adjustable camera sight, so that this unit does not work in conjunction with other sights on the firearm, but operates as a complete unit, with this camera sight and smart phone or tablet mount being of the same type as seen in FIG. 12 A through FIG. 17, with the only difference being that the non-tactical version seen in drawings of FIGS. 18 and 19, has no rotating or angle adjusting abilities. This non-tactical version also has a much larger battery capacity, so it would have a radically extended run time. FIG. 18 is a drawing that also shows the internal components of the sight adjustable camera sight in accordance with the principles of the present embodiment.

FIG. 19 is a drawing of a side view of the sight adjustable non-tactical version of this invention. Notice that the smart phone or tablet clamp housing is not seen in this illustration. This is because it is located behind the center battery compartment which would house the batteries to power the camera sight, and the view of this is obstructed by the larger battery compartments located to each side of this center battery compartment, that would enable an extended run time in accordance with the principles of the present embodiment.

FIG. 20 is a drawing of an overhead view of the non-tactical design of the sight adjustable camera sight and smart phone and small tablet mount of FIG. 19. Numbers 51 are the batteries that would power the infrared illuminator and camera sight. Numbers 28 are the lids for the battery compartments in accordance with the principles of the present embodiment.

FIG. 21 is an overhead view of the non-tactical version of this invention where the camera is height adjusted to acquire the best vantage point of the target image provided from various sights or scopes on the firearm that it is working in conjunction with. This is the non-tactical version of the first embodiment of this camera sight seen in FIG. 1A through FIG. 11 in accordance with the principles of the present embodiment.

FIG. 22A is a drawing of the back side of the combination rear viewing camera, #78, and housing, #77, that houses the viewing screen, and camera and battery that powers this tiny self-contained unit in accordance with the principles of the present embodiment.

FIG. 22B is a drawing of the front side of the combination rear viewing camera #78, and housing #77, which houses the viewing screen, #79, and camera, #78, as well as the controls for same in accordance with the principles of the present embodiment.

FIG. 23A is a drawing of a side view of the rear combination rear viewing camera and housing, that houses the viewing screen and camera #78, and battery that powers this tiny self-contained unit. The armature #62, is what this tiny self-contained unit mounts to and angle adjusts on. Notice this armature is slightly angled. This is because the smart-phone mounting base, not shown, that this armature is mounted to, is also angled at the same angle.

FIG. 23B is a drawing of a slightly angled inward, side view drawing of the rear viewing camera armature, with the tiny self-contained rear viewing camera unit removed from the armature #62 in accordance with the principles of the present embodiment.

FIG. 24 is a drawing of an illustration of the rear view of the rear viewing camera and camera housing #61, as well as armature #62, which would be an integral part of this rear viewing camera housing in accordance with the principles of the present embodiment.

FIG. 25 is a drawing of an illustration of the slightly off-skew profile view of the rear viewing camera and camera housing #61, as well as armature #62, which would be an integral part of each other in accordance with the principles of the present embodiment.

FIG. 26 is a drawing of the mounting clamp for the rear viewing camera armature #62, which is height and angle adjustable therein, in accordance with the principles of the present embodiment.

FIG. 28 is a reassembled rear viewing camera this completely assembled mounting clamp or mount would remain completely assembled and attached to the armature when removed from its mounting base #73 and could be stored as one unit and re employed by simply re fastening the whole unit as one piece onto its mounting base.

DETAILED DESCRIPTION OF THE INVENTION

Figure 1:
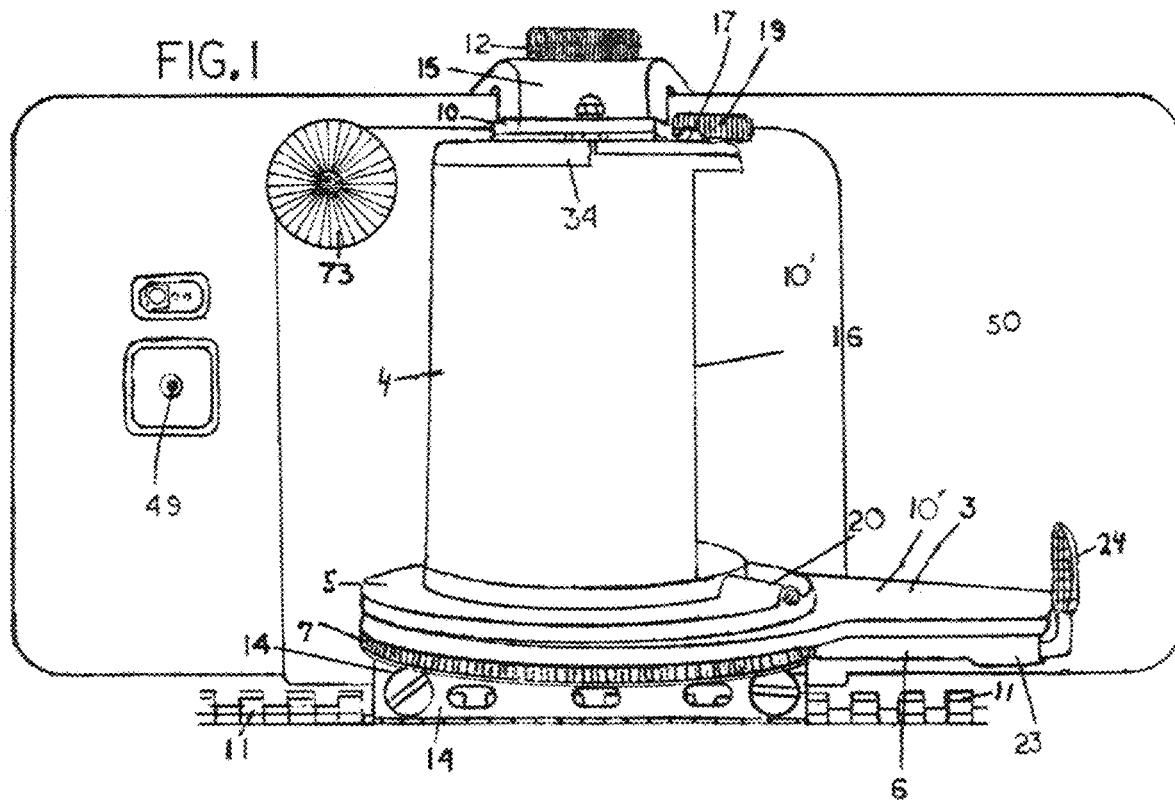
FIG. 1 is a drawing of a profile view of the rail mount, camera and battery housing and a back side view of the smart device mount of this invention in its first embodiment, being a height adjustable camera in its own housing integral to a rail mount, which is also integral to a rotate-able smart device mount. This drawing also shows the mounting platform for the rear viewing camera #73 in accordance with the principles of the present embodiment.

FIG. 1 is a drawing of the invention in its first embodiment being an HD infrared viewing camera with its own Wi-Fi transmitting module. This camera vertically adjusts to various heights to acquire the best vantage point to receive the target image received from other various sights on the firearm such as red dot sights and scopes, and transmits its image to the smart phone that mounts on the device. The height adjustable camera housing, #4, is integral to the rail mount, #14, so the camera always remains parallel to the weapon's rail. Then smart phone mount rotates and locks into various positions from side to side of the firearm in a radius up to approximately 270 degrees. This is accomplished by pulling the finger pull, #24, which is integral to a spring loaded pin or rod that is housed in rod housing, #6, with the spring that maintains tension to the rod housed in housing, #23. This pin, in turn, locks into teeth or notches, #7, which are an integral part of the rail mount, #14. This finger pull housing, #6, and spring housing, #23, are an integral part of #3, which rides on either roller or inserted ring shaped bearings, located on the top of the round base plate of rail mount, #14, just above the teeth #7 on the outer perimeter of the round base plate, #7. This plate, #3, rides between the top base plate of rail mount and underneath the threaded flange, #5, where there are bearings located on each side of #3. In the model of this invention that has ball bearings, this plate, #3, has a round dished out area both on the top and the bottom that creates a bearing race that these bearings ride in. The top of the round base plate, #14, as well as the bottom threaded flange, #5, also have round dished out areas making up the other sides of the bearing races that the bearings ride in. The inside of the flange, #5, is threaded as well as the outside base of #4, which is the housing for the camera sight and batteries, is also threaded, so that flange, #5, is adjustable so that once bearing assemblies are all tightly adjusted, so that the plate, #3, rides between the rail mount, #14, and #5, solidly, but freely. Then, once adjustments are made, this collet is secured to the base of camera and battery housing, #4, with the set screws located in the set screw housings, #20, that are an integral part of threaded flange, #5. This allows the plate, #10, that is an integral part of the base plate of the smart phone mount to rotate freely, and be lockable into variable points of rotation, by means of the finger pull, #24, that is an integral portion of a pin or rod #35 that when pulled, compress the return spring, not seen) as well as releases #35 from its engaged recessed notch #7 located around the upper periphery of the upper portion of the rail mount #14, some of these components viewable in FIGS. (4 and 7-C) thus allowing the user, to rotate and lock the smart phone around to various angles of adjustment, to acquire best vantage point of the smart phone screen, which is the target screen. Number 73, is a baseplate that's an integral portion of the smartphone baseplate, #10. This baseplate has multiple raised portions or teeth that extend outward from the threaded inner portion of this baseplate that lock into matching digitally proportioned teeth in the bottom portion, #72, of the camera armature clamp, not shown in accordance with the principles of the present embodiment.

Figure 2:
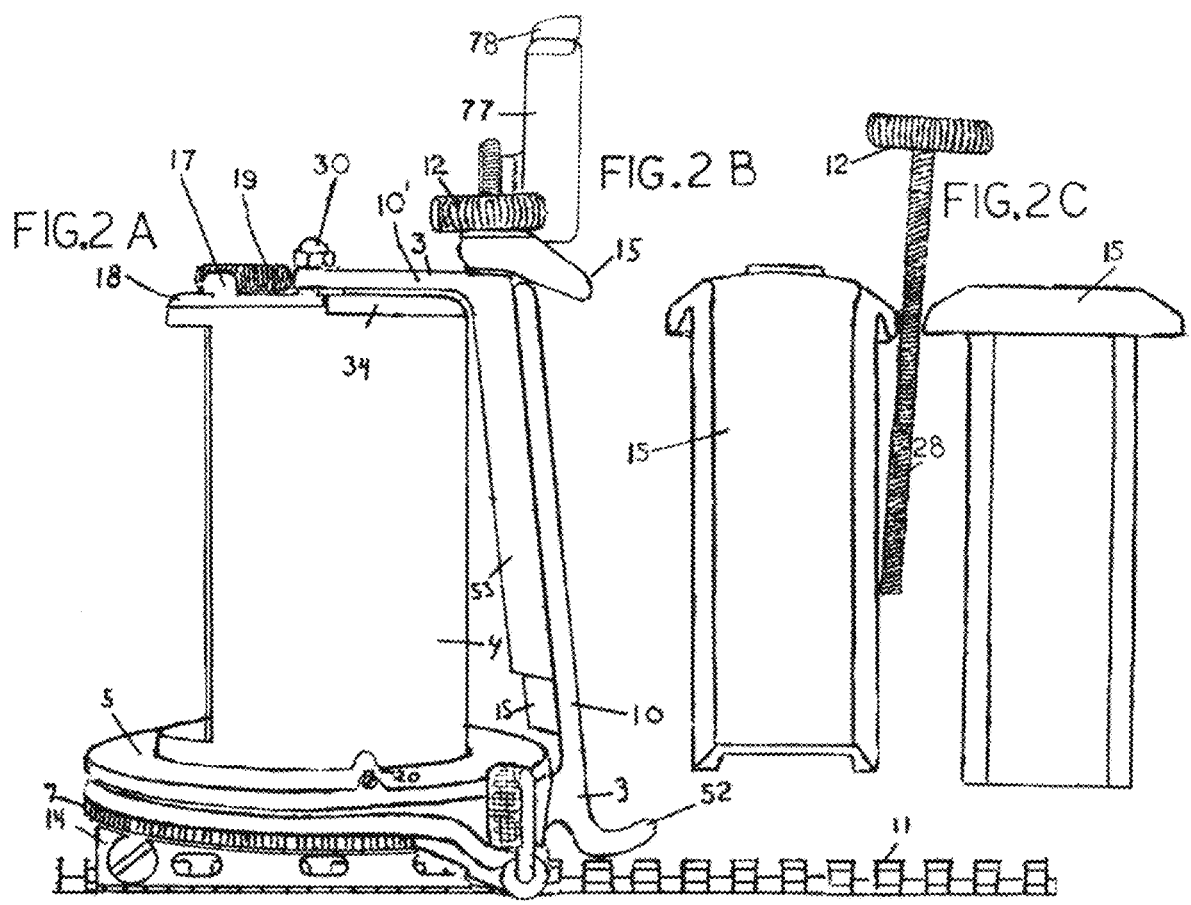
FIG. 2A is a drawing of a profile view of the invention in its first embodiment possessing a height adjustable camera in its own housing integral to a rail mount, which is also integral to a rotatable smart device mount that functions as well night, as well as during the day, with very effective night viewing abilities. This drawing also shows the rear viewing camera #78 accordance with the principles of the present embodiment.
FIGS. 2B and 2C are drawings of the back FIG. 2B and front side FIG. 2C of this sliding clamp, #15. Notice that the inside of this clamp seen in FIG. 2C, is open or hollow, allowing threaded rod, of FIG. 2C #28, to be housed therein.

FIG. 2A is a drawing of a side or profile view of the invention with the smart phone removed from its base plate, #10, which is an integral part of the plate, #3, that is integral to the finger pull rod housing, #6. This smart phone mounting or base plate is also an integral part of the phone or small tablet securing clamp housing and the bar or plate that extends laterally and is rotationally secured to the top of the camera sight's housing, #4, so that when the finger pull, #24, is pulled, releasing the pin from the teeth or grooves, #7, that are an integral part of the mount, #14, and camera and battery housings, #4, the smart phone that is mounted on this device is free to rotate and lock into its desired position of use. Number 15 is the slide and clamp that secures smart phone or tablet solidly into the smart phone or tablet cradle, #52. This is accomplished by turning the knob, #12, which is integral to a threaded rod, #28, that threads into a threaded collet inside the top of the clamp in accordance with the principles of the present embodiment slide housings, #53, so that this clamp can secure smart phones and small tablets of various sizes and dimensions. This drawing also shows a side view of the rear viewing camera, #78, that is an integral part of its viewing screen and battery housing, #77 in accordance with the principles of the present embodiment.

FIG. 2B and FIG. 2C are drawings of the back and front side of this sliding clamp, #15. Notice that the inside of this clamp seen in FIG. 2C, is open or hollow, allowing threaded rod, #28, to be housed therein. This threaded rod #28 extends through a hole in the top portion of slide, #15, and is threaded into the threaded collet, not shown, located on the top inside portion of this slide housing, allowing any smart phone or small tablets to be secured tightly into the cradle #52, portion of the smart devices platform #10, by means of clockwise, rotation of the thumbscrew knob #12, with removal of the smart device mounted on platform #10, simply accomplished by means of opposite directional rotation of #12, in accordance with the principles of the present embodiment.

Figure 3:
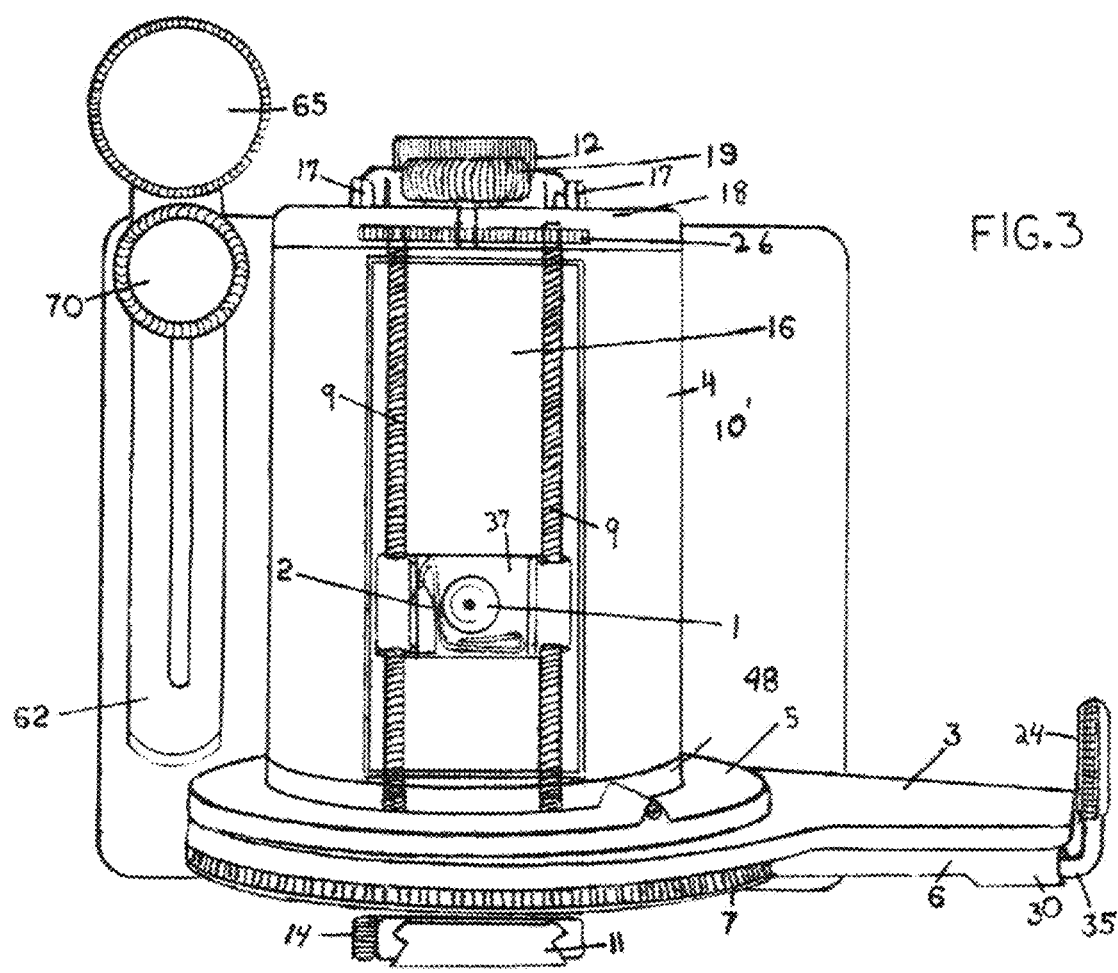
FIG. 3 is a drawing of a frontal view of the invention in its first embodiment being a height adjustable camera in its own housing integral to a rail mount, which is integral to a rotatable smart device mount with a rear viewing camera. This drawing also shows the rear viewing camera the image transmitted, receivable in a split screen or window on the smart device's screen, in accordance with the principles of the present embodiment.

FIG. 3 is a drawing of this device rotated and locked into position as if the user was using the firearm in the conventional manner so the tiny HD infrared viewing camera, #1, and Wi-Fi transmitting module, #2, as well as the mechanism that raises and lowers the camera into its desired height to acquire the best vantage point of the target image provided by the sight or scope that this device would be receiving its target image from can be viewed. Number 37 is the plate or small three sided box with threaded collets that ride up and down vertically on threaded rods, #9, that ride in two drilled out sections or cup bearings in the top of the base plate, that is an integral part of the rail mount and main camera and battery housing #4. These rods extend up through the entire length of this camera sight housing where they have gears with internal splines that insert on splines located at the very top of these rods and are rotated simultaneously by turning the height adjustment knob, #19, which extends down through the top cover plate of the camera sight housing which has an additional gear that turns the gears on these rods, once knob #19 is turned. These gears are located in a small gear housing between the top cover plate, #18, and the bottom of the gear chamber, #54, so that when knob, #19 is turned one direction, the camera and Wi-Fi transmitting module are raised inside this housing behind the window in the housing, #16, and when the knob is rotated in the opposite direction, the camera is lowered so desired height adjustment can be made to this camera to acquire its best target image provided by the sights or scopes that this invention is working in conjunction with. A more simplistic, and perhaps even better design of this lifting mechanism that may be implemented, would be for the outer end portions of this compartment #37, that houses the camera #1 and WI-FI or other type of radio transmitter #2, would not possess these threaded portions, but would be configured to ride in tracks that would be made as an integral portion of the camera and battery compartment #4, and be raised and lowered by means of one threaded rod integral to height adjusting knob #19, that would be threaded through a threaded portion of #37. This drawing also showing armature #62, that is an integral part of the rear viewing camera housing that houses the H.D. infrared viewing camera, as well as its WI-FI transmitting module, batteries, etc., lowered down and locked into its lowest position of adjustment, with the armature secured into the height and angle adjustable armature clamp, and tightly secured by means of tightening knob #70, in accordance with the principles of the present embodiment.

FIG. 4 is a drawing of the bottom view of the combination base plate and smart device mount #3, as well as a dished-out portion #22, of #3, that makes up the top bearing race for the bottom set of ball bearings, #21, that ride in the other dished-out or bottom bearing race portion of rail mount #14. An additional dished out or bearing race portion #22, of #3, is located in the top of this base plate, #3, seen in FIG. 6, that an additional set of bearings #21, ride in, and all of these bearings along with base plate #3, are compress ably secured in, by means of an upper plate #5; the bottom portion and upper bearings viewable in FIG. 5, with another dished out or bottom bearing race portion #22, thereof with an inner fascia portion that threads on to the bottom outer portion of the camera and battery housing #4, on to threads #25, as seen in FIG. 6. This drawing also shows the finger pull, #24, that is integral to the rod, #35, housed in the housing, #6, as well as spring and spring housing, #23, that maintains pressure to the rod that locks this device into the notched or toothed section, #7, located in the outer perimeter of the rail mount, #14. This rod housing, #6, and spring housing, #23, are an integral part of this rotating base plate, #3 and shown as being transparent to view the inner workings thereof, in accordance with the principles of the present embodiment.

FIG. 5 is top bearing race and collet that the other set of bearings ride in. The inner edge of this collet is threaded, #47, and threads onto the threads, #25, located at the base of the sight and battery housing, #4, which is an integral part of the rail mount, #14. This threaded collet, with its bearing race and bearings, makes the second set of roller bearings, that plate, #3, rides and rotates on, so that these sets of bearings are located on both the top and the bottom of rotating plate, #3 in accordance with the principles of the present embodiment.

FIG. 6 is a drawing of a side view of the rail mount, #14, solidly mounted to weapon's rail, #11, as well as lower set of ball bearings and camera and battery housing, #4, that is an integral part of rail mount, #14 in accordance with the principles of the present embodiment.

FIGS. 7 A, B, C, and D, are drawings of an alternative type of bearings that the plate, #3, ride on and rotate on, consisting of a raised ring, #32, located on both the top and bottom of plate, #3, that lock into and ride in, an inset or cut-out ring shaped portion, located both in the top surface of the rail mount, #14, and in the bottom of the threaded ring, #5, as well as both in the top and bottom portion base plate #3. The advantage of this alternative bearing design would strictly be economic, in that it would be less expensive and easier to manufacture. The disadvantages would be greater drag or resistance in rotation even though these inset ring shaped bearing would be made of a material that would produce as little friction-producing drag or resistance as possible, such as Delrin or other. This design still could not be adjusted nearly as tight, while maintaining its rotating ability, which would make this design less rigid and structurally stable, which is important because of the forces of inertia that this device would encounter during recoil in accordance with the principles of the present embodiment.

FIGS. 8 A, B, and C, are drawings showing a top view of the same components of FIGS. 4,5 and 6. This first drawing, FIG. 8A is showing the base plate, #3, which rides between the threaded flange, #5 of FIG. 8C, t that acts as a bearing race that extends around the inner circumference of the opening in the center of base plate, #3, that fits over the camera sight housing and battery compartment, #4, seen in FIG. 8 B, and the lower side of which rides on the bearings, #21, located around the outer perimeter at the base of the camera and battery housing, #4, which is an integral part of this rail mount, and these bearings are located between the camera and battery housing, and between the teeth or notches on the outer perimeter of the round base plate, #7. This plate, #3, rides between the top base plate of rail mount and underneath the threaded flange, #5, where there are bearings located on each side of #3, in the model of this invention that has ball bearings, seen in FIGS. 8 A, B, and C. This plate, #3, has a round dished out area both on the top and the bottom that creates an additional bearing races that these bearings ride in. The top of the round base plate, #14, as well as the bottom threaded flange, #5, also have round dished out areas making up the other sides of the bearing races that the bearings ride in. The inside of the flange, #5, is threaded as well as the outside base of the camera and battery housing, #4, which is the housing for the camera sight and batteries, is also threaded so that flange, #5, is adjustable, so that once bearing assemblies are all tightly adjusted, so that the plate, #3 rides between the rail mount, #14, and #5, solidly, but freely. Then once adjustments are made, this collet is secured to the base of camera and battery housing, #4, with the set screws located in the set screw housings, #20, that are an integral part of threaded flange, #5. These set screws are located in a position on the top portion of flange, #5, where they make contact with the camera housing, #4, just above the threaded portion of the camera housing, #4. This allows the plate, #10, that is an integral part of the base plate of the smart phone mount to rotate solidly and freely. This allows the finger pull, #24, when pulled, to rotate and lock the smart phone around to various angles of adjustment, to acquire best vantage point of the smart phone screen, which is the target screen for this device in accordance with the principles of the present embodiment.

FIG. 9 A is a drawing of an overhead view of the device. The smart phone mount would be an integral part of base plate, #3, shown in this illustration as rotate-able around the battery compartment. The height-adjustable camera assembly can be viewed, as well as the other components, such as the gears, #26, seen in FIG. 9 B, and the knob, #19, that turns these gears, #26, which turns the threaded rods, #9, that raises and lowers the camera and Wi-Fi transmitting module so that the camera can be adjusted at the proper height to acquire the best lineal view or vantage point of the sights on the firearm that it is working in conjunction with. Number 4, seen in FIG. 9 A, is the height adjustable camera assembly and battery housing which is an integral part of rail mount, #14, not shown. Number 29 is the battery compartment. Number 25, seen in FIG. 9 B, is a drawing of the lid for the battery compartment. Number 28, seen in FIG. 9 B, is the cover or base plate, that, when mechanically fastened and installed over camera assembly, goes over the threaded rods, #9, holding them solidly in alignment, where the two smaller gears, #26, seen in FIG. 9 A, which have small inner splines that are press fitted over the tiny splines located at the top of the threaded rods, #9, to securely fasten these smaller gears to these rods. The larger gear, #26, is press fit to the knob and rod, #19, seen in in accordance with the principles of the present embodiment.

FIG. 9B is a drawing that shows the cover plate, #18, which is to be installed and sealed to the top of the camera and battery housing, #4, as well as the battery compartment lid #25. The two stops, #17, seen in FIG. 9 B, stop the plate or rod that is integral to smart phone base plate and rotating plate, #3, that fits over and pivots on the shaft, #15, and when this plate or rod comes in contact with the stops, #17, it determines the smart phone's maximum point of rotation to each side of the firearm. Number 19 is the knob that turns the gears that raises and lower the camera compartment, which houses the HD infrared viewing camera, and WI-FI transmitting module, in accordance with the principles of the present embodiment.

FIGS. 10 A and 10 B are drawings of simply magnified views of the top of the camera sight and battery housing and its gear assemblies, seen in FIGS. 9A and in accordance with the principles of the present embodiment 9B, with base plate of the gear housing, #28, with gear assemblies removed from shafts, #9 in accordance with the principles of the present embodiment.

FIG. 11 is a drawing showing the gear housing base plate, #28, mechanically fastened in place as well as the gears fastened to the tops of threaded shafts, #9, and the center gear, that is turned with height adjusting knob set in place in accordance with the principles of the present embodiment.

Figure 17:
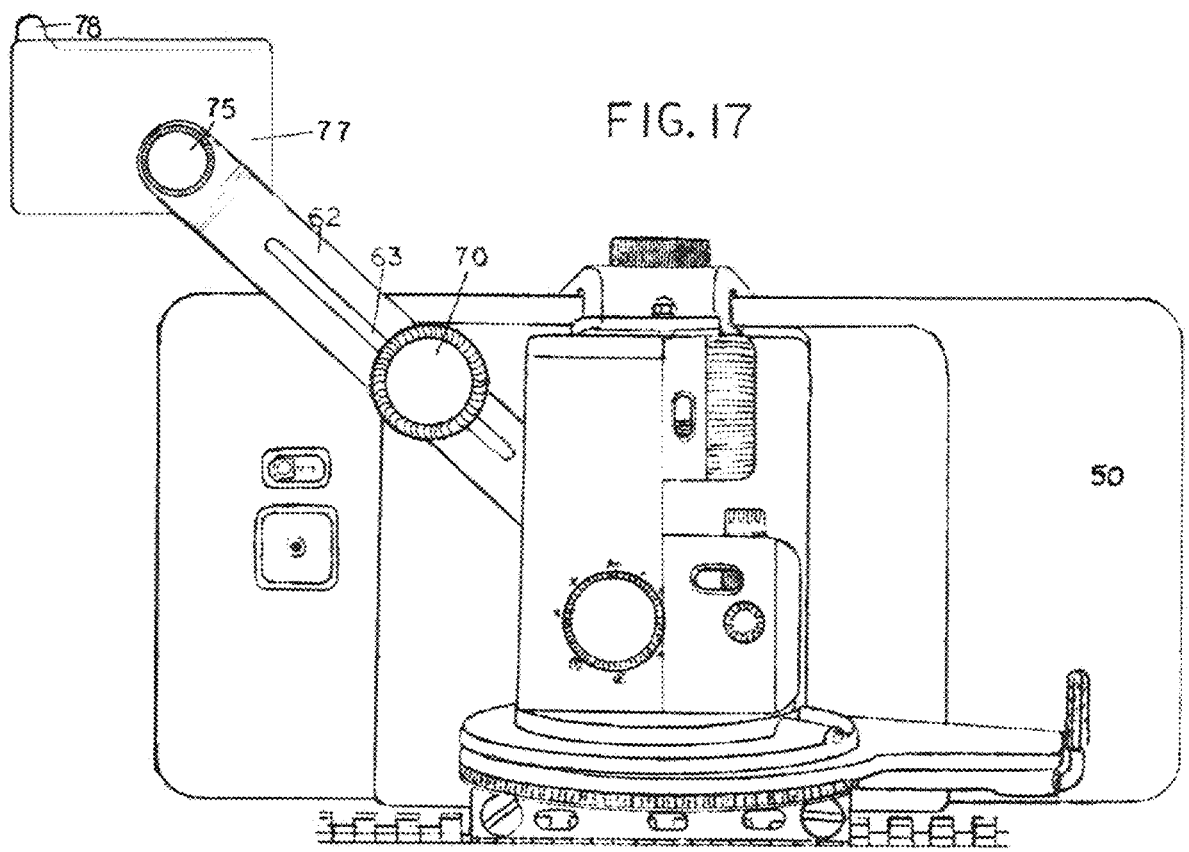

FIG. 12 A through FIG. 17 are drawings of this invention in its second embodiment which is a non-height adjustable, but sight adjustable, HD infrared viewing camera with its own Wi-Fi transmitting module that transmits its sighted-in target image and reticle image to the smart phone or tablet that mounts to this device. This embodiment of this invention works independently from other sights on the firearm so that the camera sight and smart phone or tablet work together as a complete unit. FIG. 12A shows a profile view of this device in its second embodiment with the infrared illuminator #43, and rear viewing camera #78, and battery compartment and viewing screen housing #77, in accordance with the principles of the present embodiment.

These drawings, 12 A through FIG. 19, also show this device with an integral infrared illuminator in that all of the cameras used in these camera sights have infrared viewing capabilities so that they work almost as well at night as they do during the day, restricted only by range or field of view.

FIG. 12A shows the camera sight housing as if the housing was transparent, so the inner workings of the camera sight can be viewed. Number 57 in FIG. 12 A is the dotted line indicating the projected reticle beam that is reflected off the inside of the sight window, #58, directly in front of the camera lens of the infrared viewing HD camera, #1, so as to acquire a full wide view of the surrounding area, with the target reticle, that, when this sight is sighted to target, the camera is perfectly sighted in to the target behind the projected reticle, so that the target image is transmitted to the smart phone or small tablet mounted on the camera mounting base plate with target image appearing in the perfect center of the smart phone or tablet screen behind the reticle. Number 42 is the reticle selector and housing for the button battery that powers the reticle beam. Number 40 is the vertical sight adjustment for the camera sight. Number 2 is the Wi-Fi transmitting module. Number 39 is the off and on switch for the camera sight. Number 38 is the off and on switch for the infrared illuminator. Number 43 is the beam width adjustment for the infrared illuminator. Number 34 is the lid to the battery compartment. Notice this lid can only be removed when the camera is rotated just beyond 90 degrees to either side of the firearm. Number 15, seen in FIG. 12 A, is the top of the clamp seen in FIG. 12 B, in accordance with the principles of the present embodiment.

FIG. 12 B, is a drawing that shows both the front and back side of this smart phone or tablet clamp that is loosened and tightened into place with a thumb screw, #12. The threaded rod, #12, is extended through the hole in the top of clamp #15 and is threaded through a threaded collet located in the upper inside portion of the inside top of the clamp housing, located just behind the camera mounting base plate (not seen). This clamp housing and smart device mounting base are integral and part of each other. This smart phone or tablet clamp is the same as seen and described in FIGS. 2B and 2C in accordance with the principles of the present embodiment.

FIG. 13 is a drawing of the camera sight as if none of the components of this device were transparent so the entire device can be viewed as true to its image. Number 41, which was not illustrated in FIG. 12A, is the lateral or horizontal sight adjustment for the camera sight. Number 61 is the camera, WI-FI transmitting module and battery housing which also would house the on/off switch, indicating light, etc. Note, thermal optics could be added as an integral part, or attached to, this camera housing as the wire for same would simply be plugged in at the charging port of the smart phone, not shown, in accordance with the principles of the present embodiment.

FIG. 14 is a drawing of the front view of the camera sight in its second embodiment, which functions as a complete unit, with its own sight adjustable camera sight seen in all FIG. 12A through FIG. 17. This drawing shows this device with the rear viewing camera and armature removed from the device, in accordance with the principles of the present embodiment.

FIG. 15 is a drawing of an overhead view of the camera sight with the smart phone or tablet mount rotated around to the front of the firearm, in a position where the battery lid, #28, is removed to reveal battery, #26, in accordance with the principles of the present embodiment.

FIG. 16 is a is a drawing of a profile view of the device, with the smart phone or small tablet mount rotated to approximately 90 degrees and locked into position so smart phone or small tablet mounting base can be viewed. This smart phone mounting base is engineered to accommodate any smart phone or small tablet so that the smart phone or tablet can be situated or clamped onto this base plate, #10, compressably securing same onto the upper portion of the smart device cradle, which is an integral lower portion of base plate #10, not shown, with the clamp and the tightness adjusting knob, #12, so that smart phone or tablet can be positioned to provide the best vantage point of the target screen which this smart phone or tablet would provide to the user. This drawing also shows the back side of combination rear viewing camera, #78, and its screen and battery housing, #77, facing aft, with the camera armature, #62, adjusted down into a very low vertical position, just above the smartphone screen in accordance with the principles of the present embodiment.

FIG. 17 is a drawing of the device with a smart phone mounted on its smart phone mounting baseplate, with the smart phone rotated around to, and locked, into a position of approximately 90 degrees to the weapon's rail. Notice that the camera sight and infrared illuminator, always remains parallel to the weapon's rail in its sighted in position, in that, the housing for same is integral to the rail mount, and the base plate, #3, which is integral to #10, which is the smart phone or tablet mounting base plate, as well as the clamp housing and stabilizing arm, on which all rotate and lock into various desired angles of use on #14. This drawing also shows the back side of combination rear viewing camera, #78, screen and battery housing, #77, facing aft with the camera armature, #62, adjusted upward at an angle into a position to acquire its best vantage point of both the camera, #78, and its viewing screen position in accordance with the principles of the present embodiment.

FIG. 18 and FIG. 19 are drawings of this invention in a non-tactical version, with a sight adjustable camera sight, so that this unit does not work in conjunction with other sights on the firearm, but operates as a complete unit, with this camera sight and smart phone or tablet mount being of the same type as seen in FIG. 12 A through FIG. 17, with the only difference being that the non-tactical version seen in drawings of FIGS. 18 and 19, has no rotating or angle adjusting abilities. This non-tactical version also has a much larger battery capacity, so it would have a radically extended run time. FIG. 18 also shows the internal components of the sight adjustable camera sight portion of this device as if the sight housing was transparent. Number 1 is the HD infrared viewing camera, mounted inside the sight housing, directly behind the reflected reticle, #57, on the back of the sight window, #58. Number 2 is the WI-FI transmitting module; dotted lines indicate viewing angle, #44 of camera, #1, and reticle beam angle #57 in accordance with the principles of the present embodiment.

FIG. 19 is a drawing of a side view of the sight adjustable non-tactical version of this invention. Notice that the smart phone or tablet clamp housing is not seen in this illustration. This is because it is located behind the center battery compartment which would house the batteries to power the camera sight, and the view of this is obstructed by the larger battery compartments located to each side of this center battery compartment that would be the batteries that would power the infrared illuminator. Notice the reticle selector and control unit, #42, is located on the camera sight itself. Number 40 is the vertical sight adjustment. Number 41 is the lateral or horizontal sight adjustment. The off and on switch for the infrared illuminator, #38, and the beam width adjustment for the infrared illuminator, #43, are the same as seen in previous illustrations. Number 50 is a smart phone in accordance with the principles of the present embodiment.

FIG. 20 is an overhead view of the non-tactical design of the sight adjustable camera sight and smart phone and small tablet mount of FIG. 19. Numbers 51 are the batteries that would power the infrared illuminator and camera sight. Numbers 28 are the lids for the battery compartments, in accordance with the principles of the present embodiment.

FIG. 21 is a drawing of an overhead view of the non-tactical version of this invention where the camera is height adjusted to acquire the best vantage point of the target image provided from various sights or scopes, on the firearm that it is working in conjunction with. This is the non-tactical version of the first embodiment of this camera sight, seen in FIG. 1A through FIG. 11. Number 1 is the HD infrared viewing camera that is situated directly behind the window, #16. Number 2 is the Wi-Fi transmitting module, in that the type of camera illustrated in this drawing is a combination HD infrared viewing camera with its own Wi-Fi transmitting module. This camera is basically the same type and quality used in smart phones, and these tiny HD infrared viewing cameras and Wi-Fi transmitting modules, are widely available and used as higher quality spy cameras, which is the type of camera used in the rough prototypes of these camera sights. There are several available types of cameras on the market employable in these camera sights, and all are available with infrared viewing abilities for night vision capabilities. All have other advantages and disadvantages to each other, consisting of things like cost, size, power consumption, and abilities, with one of these more cost inhibitive options possessing very high resolution zooming abilities, although the zooming controls would actually be on the camera sight portion of the device itself, rather than controllable on the smart device's screen, which shouldn't prove as problematic in any way, due to their close proximity to each other. Number 56 is the bottom of the cover for the camera housing which shows the center gear that is press-fit to the rod or shaft that is integral part of the knob, #19. This center gear turns the two smaller gears that would be press-fit to the top of the threaded rods, #9, that extend through the threaded housings that are located on the side of and are an integral part of the camera housing, so that as knob is rotated from one direction to the other. This camera sight housing and the camera sight, is raised and lowered into its desired position. The very top of these rods, which would extend through these smaller gears, would ride in the small insets or cup bearings, #55, which are an integral part of this cap or lid, #56, which would be mechanically fastened and sealed to the top of the camera housing. This drawing shows this device as having two smaller infrared illuminators, located and made as an integral part of the front part of the housing of this device, on each side of the camera housing and in front of the battery compartments. Numbers 51 are the batteries, in accordance with the principles of the present embodiment.

FIG. 22A is a drawing of the back side of the combination rear viewing camera, #78, and housing, #77, that houses the viewing screen, and camera and battery, which powers this tiny self-contained unit, in accordance with the principles of the present embodiment.

FIG. 22B is a drawing of the front side of the combination rear viewing camera #78, and housing #77, that houses the viewing screen, #79, and camera, #78, and battery that powers this tiny self-contained unit. Controls #80, are for functions such as on/off switch, zoom, or brightness control, etc. This rear viewing camera is mounted to, and angularly and height adjusted on, armature #62, in accordance with the principles of the present embodiment.

FIG. 23A is a drawing of a side view of the rear combination, rear viewing camera and housing, that houses the viewing screen, and camera #78, and battery that powers this tiny self-contained unit. The armature #62, is what this tiny self-contained unit mounts to, and angle adjusts on. Notice this armature is slightly angled. This is because the smartphone mounting base, not shown, that this armature is mounted to, is also angled at the same angle, in accordance with the principles of the present embodiment.

FIG. 23B is a slightly angled inward, side view drawing, of the rear viewing camera armature, with the tiny self-contained rear viewing camera unit removed from the armature #62. The threaded end of rod, which is an integral part of knob #75, is inserted through a hole, centered in the end portion of the armature #62, and is then threaded into base #82, which is an integral part of the camera viewing screen and battery housing #77, as with this threaded rod loosened, the self-contained camera viewing screen can be rotated into its desired angle of use, and then re-secured by means of rotation of the knob #75, so that the threaded portion of the rod, that is an integral end portion of knob, #75, is threaded into its base #82. The raised ridges or teeth located on the upper platform of the base #82, are locked into their corresponding lower grooves or notches, between the raised teeth or ridges, located on the lower platform surface, #81, of the end portion of the armature #62. Knob #75, is rotatably tightened, securing this self-contained unit into its desired angle of use, in accordance with the principles of the present embodiment.

FIG. 24, is an illustration of the rear view, of the rear viewing camera and camera housing #61, as well as armature #62, which would be an integral part of this rear viewing camera housing of FIGS. #3 and #13, with the camera housed therein, of the type of camera with its own WI-FI transmitting module, that transmits its image to the smart phone or tablet that it is working in conjunction with, by WI-FI transmission, in accordance with the principles of the present embodiment.

FIG. 25 is an illustration of the slightly off-skew profile view of the rear viewing camera and camera housing #61, as well as armature #62, which would be an integral part of each other, of FIGS. #3 and #13, with the camera housed therein of the type of camera with its own Wi-Fi transmitting module, that transmits its image to the smart phone or tablet that it is working in conjunction with, by Wi-Fi transmission. This camera housed inside camera housing #61, receives its surveilled image through window #67, located in the very forward portion of camera housing #61. A battery compartment, an integral part of camera housing #61, which houses batteries supplying power both to camera and WI-FI transmitter, housed in the forward section of camera housing, #61. A watertight lid, #65, to battery compartment, creates access to power supply housed therein. A charging port #69, and indicator light is supplied to recharge batteries. A switch and indicator light #68, is supplied to turn on camera and Wi-Fi transmitting module therein. This device could also easily be equipped with an infrared illuminator, as an added portion, either on top or on the side of camera housing #61, as well in that, the cameras employed in these devices are widely available, and would all have infrared viewing capabilities, in accordance with the principles of the present embodiment.

FIG. 26 is a drawing of the mounting clamp for the rear viewing camera armature #62, which is height and angle adjustable therein. Threaded rod #74 inserts through slot #63, in armature #62, and is threaded into and tightly secured into its base portion #73, which is an integral part of the smartphone mounting base #10, seen in FIGS. 1, 14, and 15. A larger drawing of this mounting clamp and a more detailed is provider in FIG. 28

Figure 27:
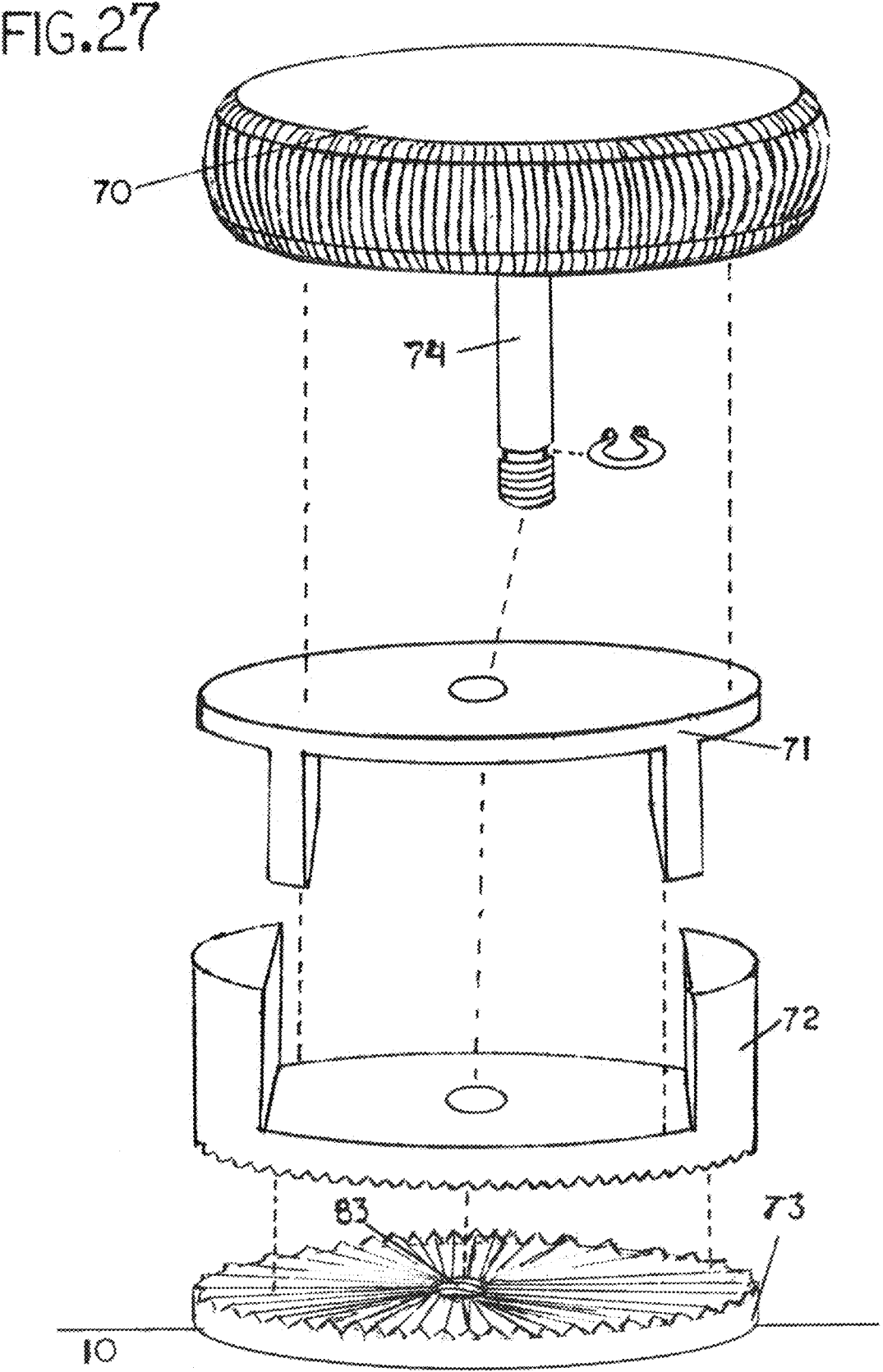
FIG. 27 is a drawing of a blown-up view of rear viewing position adjustable camera mount.

FIG. 27 is a drawing, showing a blown up view, of rear viewing position adjustable camera armature mount, previously seen in assembled form in FIG. 26 Threaded rod #74, includes a smooth upper section that turns freely. Rod #74, is then inserted through hole in the center of the upper section of the platform of jaw or clamp #71, then through center cut-out or slot of the camera armature #63, and thusly passed through the hole, centrally positioned in the rotatably positionable, lower section or part of jaw or clamp #72. Then C clip is inserted into the groove located between the smooth part of the upper section of threaded rod #74, and the bottom threaded section of rod #74, locking these parts together. This C clip is housed in an inset section that extends around the outer perimeter of the bottom of hole, located in the center of lower portion of the rotationally positionable jaw #72, not shown. This inset C clip allows the loosening of the mount, as the C clip can travel inside inset area while loosening or tightening, while maintaining the assemblage of the rotationally adjustable mount, to the camera and armature #62, so that this device can be removed from rotationally adjustable camera sight smart phone mount, and stored when not in use, then simply attached as a complete unit for deployment. Then the threaded end of rod #74, an integral part of knob #70, is threaded into base #73, an integral part of rotatably adjustable camera sight and smart phone mount, so that as knob #70, is rotatably threaded into base #74, allowing the camera armature #62, to be extended and rotated to its desired position of use and as knob #70, is continuously rotated, the raised ridges or teeth located on the upper platform of the base #73, are locked into their corresponding lower grooves or notches between the raised teeth or ridges located on the lower platform surface of the rotatably adjustable lower jaw #72, and thusly as tension adjustable knob #70, is rotatably tightened, rear viewing positionable camera armature, is compressably secured between upper platform section of lower jaw #72, and lower housed platform section of upper jaw or clamp #71, that armature #62, seen in FIGS. 22A, 22B,23A,23B, 24 and 25, is housed therein. This camera housing being an integral part of armature #62, can be repositioned or returned to its position of non-use in the same manner, by simply loosening knob, and re-secured in place by tightening knob #70, in accordance with the principles of the present embodiment.

FIG. 28 is a drawing of the rear viewing position adjustable camera mount, in an embodiment taught herein, as if the position adjustable camera and camera armature #62, were removed from position adjustable rear viewing camera mount leaving only the mount for same. This mount for the position adjustable rear viewing camera consists of a base or platform, #73, which is an integral portion of the smartphone mounting base #10. This mounting base is cylindrical in shape, with a plurality of teeth or ridges progressively reducing in size towards the center of base, which also contains a threaded hole located in the center of the base #73, that match up and thread to threaded end of the shaft #74, which is an integral part of tension adjusting knob #70. This threaded rod would be inserted through a hole located in the center of the upper platform portion of the tensioning jaw or clamp #71, where rod #74, could turn freely therein, and would continue through parallel slot, or cut-out portion of the armature, not shown, then extend through the hole in the center of the lower clamp or jaw portion #72, where the smooth portion of the threaded rod #74, would also turn freely therein, and tightly threaded into the threaded portion of the mounting base #73, which is an integral portion of back side of the smartphone or smart device mounting base #10, (not shown), in accordance with the principles of the present embodiment.

The invention claimed is:

1. A sighting device for use with a digital display device and a firearm having a mounting rail, the sighting device comprising:
  a housing;
  a rail mount adapted for mating with a rail on a firearm;
  a display mount attached to the housing, comprising a clamping mechanism adapted for mounting the digital display device, the clamping mechanism attached to and rotatable on the rail mount;
  a camera disposed within the housing to capture images in a field of view; and
  a transmitter coupled to the camera and capable of transmitting images captured by the camera to the display device.

2. The sighting device of claim 1, wherein at least one battery is disposed within the housing in electrical communication with, and providing power to, the camera and the transmitter.

3. The sighting device of claim 1, further comprising at least one infrared illuminator, wherein the camera is capable of capturing infrared images.

4. The sighting device of claim 1, wherein the transmitter is a wireless transmitter, and wherein the images that the camera is capable of capturing are video images, such that the transmitter is capable of transmitting the video images captured by the camera to the display device.

5. The sighting device of claim 1, wherein the transmitter can be directly coupled to the display device, and wherein the images that the camera is capable of capturing are video images, such that the transmitter is capable of transmitting the video images captured by the camera to the display device.

6. The sighting device of claim 1, further comprising sight adjustment controls that are capable of aligning the camera to a target.

7. A sighting device for use with a digital display device and a firearm having a mounting rail and a sight or a scope, the sighting device comprising:
  a housing;
  a rail mount adapted for mating with a rail on a firearm;
  a display mount comprising a clamping mechanism adapted for mounting the digital display device, the clamping mechanism attached to and rotatable on the rail mount;
  a camera to capture images in a field of view disposed within the housing; and
  a transmitter disposed within the housing and coupled to the camera and capable of transmitting images captured by the camera to the display device;
  wherein the camera is vertically adjustable inside the housing in relation to the rail mount such that the images transmitted to the display device are properly aligned with the sight or the scope of the firearm.

8. The sighting device of claim 7, further comprising a clamping device disposed on the housing, the clamping device adapted for mounting a digital display device.

9. The sighting device of claim 8 wherein the clamping device is attached to the housing such that it is rotatable relative to the housing.

10. The sighting device of claim 7 wherein the transmitter is capable of wirelessly transmitting the images captured by the camera to the display device.

11. The sighting device of claim 7 wherein the transmitter is capable of being directly coupled to the display device such that the transmitter is capable of directly transmitting the images captured by the camera to the display device.

12. A sighting device for use with a digital display device and a firearm having a mounting rail, the sighting device comprising:
 a housing connected to a rail mount, wherein the rail mount is adapted for mating with a rail of a firearm;
 a display mount attached to the housing, the display mount comprising a clamping device that is adapted for mounting a digital display device,
 at least one digital image sensor capable of capturing images in a field of view and coupled to a transmitter, both the digital image sensor and transmitter disposed within the housing, the transmitter capable of transmitting images captured by the digital image sensor to the display device; and
 sight adjustment controls capable of vertically and horizontally aligning the digital image sensor to a target.

13. The sighting device of claim 12, further comprising at least one infrared illuminator, wherein the digital image sensor is capable of capturing infrared images.

14. The sighting device of claim 12, further comprising at least one battery disposed within the housing and in electrical communication with, and providing power to, the digital image sensor and the transmitter.

15. A sighting device for use with a digital display device and a firearm having a mounting rail and a targeting device, the sighting device comprising:
 a housing connected to a rail mount adapted for mounting behind the targeting device on a firearm;
 a display mount disposed on the housing, adapted for mounting a digital display device,
 a digital image sensor capable of capturing images in a field of view, and a transmitter, wherein the digital image sensor and the transmitter are disposed within the housing, the digital sensor being vertically adjusted relative to the rail mount in order to align the digital image sensor to the sight or the scope of the firearm,
 wherein the transmitter is capable of transmitting images captured by the digital image sensor to the digital display device.

16. The sighting device of claim 15, further comprising at least one battery disposed within the housing and in electrical communication with, and providing power to, the digital image sensor and the transmitter.

17. The sighting device of claim 15 wherein the display mount further comprises a clamping device that is rotatable relative to the housing.

18. A sighting device for use with a digital display device and a firearm having a mounting rail, the sighting device comprising:
 a housing comprising an opening and a bottom portion having a rail mount;
 a digital image sensor disposed within the housing, behind the opening, the digital image sensor adapted for capturing targeting images in a field of view;
 a display mount attached to the housing and adapted for mounting the digital display device;
 wherein a lower portion of the rail mount is adapted for mating with a rail of the firearm.

19. The sighting device of claim 18 further comprising at least one battery disposed within the housing and in electrical communication with, and providing power to, the digital image sensor.

20. The sighting device of claim 18 further comprising a latching device allowing the display mount to be adjusted angularly.

21. The sighting device of claim 18 further comprising sight adjustment controls capable of aligning the digital image sensor to a target.

* * * * *